US00RE46076E

(19) United States
(12) Reissued Patent
Yamamoto

(10) Patent Number: US RE46,076 E
(45) Date of Reissued Patent: Jul. 19, 2016

(54) INPUT APPARATUS, CONTROL APPARATUS, CONTROL SYSTEM, CONTROL METHOD, AND HANDHELD APPARATUS

(71) Applicant: Sony Corporation, Tokyo (JP)

(72) Inventor: Kazuyuki Yamamoto, Kanagawa (JP)

(73) Assignee: SONY CORPORATION, Tokyo (JP)

(21) Appl. No.: 14/656,388

(22) Filed: Mar. 12, 2015

Related U.S. Patent Documents

Reissue of:
(64) Patent No.: 8,395,583
Issued: Mar. 12, 2013
Appl. No.: 12/521,364
PCT Filed: Nov. 20, 2008
PCT No.: PCT/JP2008/071157
§ 371 (c)(1),
(2) Date: Jun. 26, 2009
PCT Pub. No.: WO2009/069531
PCT Pub. Date: Jun. 4, 2009

(30) Foreign Application Priority Data

Nov. 26, 2007 (JP) ..... 2007-304877

(51) Int. Cl.
*G06F 3/033* (2013.01)
*G06F 3/0346* (2013.01)

(52) U.S. Cl.
CPC ..... *G06F 3/0346* (2013.01)

(58) Field of Classification Search
CPC ..... G06F 3/0346
USPC ..... 345/156, 157, 159, 160; 715/850
See application file for complete search history.

(56) References Cited

U.S. PATENT DOCUMENTS 5,587,558 A * 12/1996 Matsushima ..... 178/18.01 U
5,764,219 A * 6/1998 Rutledge et al. ..... 345/159
6,115,028 A * 9/2000 Balakrishnan ..... G06F 3/03543 345/157
2002/0109668 A1* 8/2002 Rosenberg ..... G05G 9/047 345/156
2005/0024326 A1* 2/2005 Betts-LaCroix et al. ..... 345/156
2007/0273645 A1* 11/2007 Bang et al. ..... 345/157

(Continued)

FOREIGN PATENT DOCUMENTS

JP 06-259190 9/1994
JP 2001-056743 2/2001
JP 3748483 12/2005

OTHER PUBLICATIONS

International Search Report dated Mar. 31, 2009, for corresponding Patent Application PCT/JP2008/071157.

*Primary Examiner* — Dennis Bonshock
(74) *Attorney, Agent, or Firm* — K&L Gates LLP

(57) ABSTRACT

An input apparatus, a control apparatus, a control system including those apparatuses, and a control method therefor with which a user can feel a linearity between a movement of the input apparatus and that of a pointer and an accurate pointing operation is possible are provided. An MPU of an input apparatus variably controls a gain value in a range from first threshold value to a second threshold value or first range, in which the input apparatus is within a low-velocity range, and controls the gain value to be constant in a range exceeding the second threshold value second range. The gain value is a value multiplied to a velocity value of the input apparatus that is obtained by an operation, the velocity value being obtained through detection of a movement of the input apparatus. Accordingly, in a relatively-low-velocity range, a pointer velocity value becomes smaller by a multi-degree function as movements of the input apparatus and a pointer on a screen become slower. As a result, accurate pointing becomes possible. Moreover, since a linearity is obtained when the input apparatus is in a relatively-high-velocity range, a user can obtain a linear operational feeling.

38 Claims, 15 Drawing Sheets

(56) References Cited

U.S. PATENT DOCUMENTS

2007/0291007 A1* 12/2007 Forlines ..... G06F 3/0488 345/173
2009/0009471 A1* 1/2009 Yamamoto et al. ..... 345/158
2009/0066646 A1* 3/2009 Choi et al. ..... 345/158
2009/0085867 A1* 4/2009 Bang et al. ..... 345/157
2009/0115724 A1* 5/2009 Yamamoto ..... 345/158

* cited by examiner (A)

(B)

(A)

(B)

(A)

(B)

(A)

(B)

(A)

(B)

INPUT APPARATUS, CONTROL APPARATUS, CONTROL SYSTEM, CONTROL METHOD, AND HANDHELD APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

The present application is a National Stage of International Application No. PCT/JP2008/071157 filed on Nov. 20, 2008 and which claims priority to Japanese Patent Application No. 2007-304877 filed on Nov. 26, 2007, the entire contents of which are being incorporated herein by reference.

BACKGROUND

The present application relates to a 3-dimensional operation input apparatus for operating a GUI (Graphical User Interface), a control apparatus for controlling the GUI in accordance with information output from the input apparatus, a control system including those apparatuses, a control method, and a handheld apparatus.

Pointing devices, particularly a mouse and a touchpad, are used as controllers for GUIs widely used in PCs (Personal Computers). Not just as HIs (Human Interfaces) of PCs as in related art, the GUIs are now starting to be used as an interface for AV equipment and game devices used in living rooms etc. with, for example, televisions as image media. Various pointing devices that a user is capable of operating 3-dimensionally are proposed as controllers for the GUIs of this type (see, for example, Patent Documents 1 and 2).

Japanese Patent Application Laid-open No. 2001-56743 (paragraphs [0030] and [0031], FIG. 3) discloses an input apparatus including angular velocity gyroscopes of two axes, that is, two angular velocity sensors. Each angular velocity sensor is a vibration-type angular velocity sensor. For example, upon application of an angular velocity with respect to a vibrating body piezoelectrically vibrating at a resonance frequency, Coriolis force is generated in a direction orthogonal to a vibration direction of the vibrating body. The Coriolis force is in proportion to the angular velocity, so detection of the Coriolis force leads to detection of the angular velocity. The input apparatus of Japanese Patent Application Laid-open No. 2001-56743 (paragraphs [0030] and [0031], FIG. 3) detects angular velocities about two orthogonal axes by the angular velocity sensors, generates, in accordance with the angular velocities, a signal as positional information of a cursor or the like displayed by a display means, and transmits it to a control apparatus.

Japanese Patent No. 3,748,483 (paragraphs [0033] and [0041], FIG. 1) discloses a pen-type input apparatus including three (triaxial) acceleration sensors and three (triaxial) angular velocity sensors (gyro). The pen-type input apparatus executes various operations based on signals obtained by the three acceleration sensors and the three angular velocity sensors, to thus calculate a positional angle of the pen-type input apparatus.

However, there is a problem that, since a user moves an input apparatus unstably in air, it becomes difficult to perform an accurate pointing operation like placing a pointer at a specific position on a screen, for example.

To solve this problem, a variability function for velocities or accelerations of a pointer is used in a planar-operation-type pointing system generally used in PCs and the like. As an example of the variability function, Windows (registered trademark) adopts a function capable of changing velocities or accelerations of a pointer. By applying an acceleration function to a movement of a pointer, a velocity of the pointer becomes higher as a velocity of a pointing operation (e.g., velocity of mouse) becomes higher. Therefore, since the velocity of the pointer becomes low when a velocity of a mouse is low, an accurate pointing operation becomes possible.

The 3-dimensional operation input apparatus, however, does not include such an acceleration variability function. In other words, a time when a velocity of the input apparatus and a velocity of the pointer become linear is more intuitional for the user than a time when an acceleration is added. Targeting a plurality of users, the inventors of the present application have conducted an experiment on sensibility of nonlinearity of velocities of the input apparatus and the pointer while making a comparison between the planar-operation-type mouse and the 3-dimensional operation input apparatus. The result showed that most users are more sensible to nonlinearity when using the 3-dimensional operation input apparatus than when using the planar-operation-type mouse. This is considered to be because, as compared to the planar-operation-type input apparatus, the 3-dimensional operation input apparatus is operated while being aimed at a screen as if to directly input to the screen information on a movement of the input apparatus, that is, as if using a laser pointer.

On the other hand, a result of a similar user test showed that most users had been unable to recognize the linearity when operating the input apparatus at an extremely low velocity. In this case, most users were only able to recognize a tendency of a qualitative movement, that is, a fact that the pointer moves fast when the input apparatus is moved fast or the pointer moves slowly when the input apparatus is moved slowly.

Moreover, irrespective of a velocity range of the input apparatus, the users as test targets had high perception sensitivity to following capability with respect to sharp acceleration and deceleration, and had been able to recognize even a 10 ms-order delay, for example. In addition, a result that an operational feeling becomes more favorable as the following capability during an operation becomes higher was also obtained.

SUMMARY

In view of the circumstances as described above, an object is to provide an input apparatus, a control apparatus, a control system including those apparatuses, and a control method therefor with which a user can feel a linearity between a movement of the input apparatus and that of a pointer and an accurate pointing operation is possible.

According to an embodiment, there is provided an input apparatus controlling a movement of a pointer on a screen, including a casing, a movement signal output means, a gain means, a control means, and a transmission means.

The movement signal output means detects a movement of the casing and outputs a signal of a velocity-related value that is related to a velocity of the casing.

The gain means obtains a pointer velocity value as a velocity value for moving the pointer on the screen by multiplying the output velocity-related value by a gain.

The control means variably controls the gain in a first range in which the output velocity-related value ranges from a first threshold value to a second threshold value larger than the first threshold value, and controls the gain to be constant in a second range in which the output velocity-related value exceeds the second threshold value.

The transmission means transmits information on the pointer velocity value obtained by the gain means.

In the embodiment, the gain is controlled variably in the first range as a relatively-low-velocity range in which the movement of the casing ranges from the first threshold value to the second threshold value and a user cannot recognize a linearity. Therefore, it becomes possible for the user to perform accurate pointing when the movement of the casing is in the relatively-low-velocity range. Moreover, the gain is controlled to be constant in the second range as a relatively-high-velocity range in which the velocity-related value from the movement signal output means exceeds the second threshold value. Accordingly, a movement of the input apparatus and a movement of the pointer correspond linearly in a range in which a velocity of the movement of the casing is relatively high, with the result that an operational feeling for the user is improved.

The velocity-related value is a velocity value or angular velocity value of the casing. Further, the velocity-related value is considered in an absolute value.

The movement signal output means includes a sensor, or a sensor and means for performing an operation based on a detection value detected by the sensor. Therefore, when the sensor is an acceleration sensor that detects an acceleration, the movement signal output means includes means for calculating a velocity value by an operation based on an acceleration value as a detection value and outputting it. When the sensor is an angular velocity sensor that detects an angular velocity, the movement signal output means obtains the velocity value based on an angular velocity value as the detection value. The detected angular velocity value can be used as the velocity value of the casing, and an angular acceleration value calculated by temporally differentiating the detected angular velocity value can be used as the acceleration value of the casing.

The first threshold value may be set to 0 or a value larger than 0.

The control means controls the gain so that the gain increases as the velocity-related value increases in the first range. The expression "so that the gain increases" refers to a case where the gain increases linear-functionally, by a multi-degree function of quadratic or more, stepwise, by a combination of at least two of the above, or various other ways to increase. The same holds true for the expression "gain increases" below. A multi-degree function of quadratic or more is not limited to a downwardly-convex function and may be an upwardly-convex function.

The control means controls the gain to be constant in a third range in which the output velocity-related value ranges from 0 to the first threshold value. As described above, since the movement of the pointer becomes linear in accordance with an operation at a start of the movement of the input apparatus (instant the input apparatus starts moving), the pointer starts moving smoothly.

The movement signal output means may output an acceleration value of the casing, and the control means may control the gain so that the gain increases as the acceleration value increases in the first range.

When the user starts moving the input apparatus or stops moving the input apparatus, that is, when the input apparatus moves at high acceleration, no accurate pointing is required. In the embodiment, the gain becomes more constant, that is, a relationship between the movement of the input apparatus and the movement of the pointer becomes more linear as the acceleration value of the input apparatus increases. Therefore, the pointer starts moving smoothly when the user starts moving the input apparatus at a high velocity, with the result that the user does not feel poor following capability of the pointer.

In the case of the variable gain, at the time of acceleration in particular, there may be users who feel poorness in the following capability. This is because, in terms of appearance, a response seems slow since the velocity of the pointer is slow in the low-velocity range. In this regard, for enhancing the following capability with respect to such sharp acceleration, the gain only needs to be controlled in accordance with a level of the acceleration. In other words, it is effective to change a velocity profile so as to obtain more linearity as the acceleration of the casing increases.

The acceleration value may be an acceleration value detected by the acceleration sensor or an acceleration value obtained by a calculation and from which gravity components and the like have been removed. The same holds true for the following embodiments.

The movement signal output means outputs an acceleration value of the casing, and the control means changes a change rate of the gain in the first range in accordance with a change in the acceleration value. When the gain is linear, the change rate is a tilt thereof. When the gain is a multi-degree curve, the gain is a differential value. At least one of the first threshold value and the second threshold value may be changed. Moreover, as a result of the embodiment, it is also possible to change the change rate of the gain so that the relationship between the movement of the input apparatus and the movement of the pointer becomes more linear.

The input apparatus may further include a storage means for storing information on a plurality of velocity-related values that are temporally consecutive in the first range, and a sign judgment means for judging whether signs of the plurality of stored velocity-related values are the same. The control means includes a gain value storage means for storing a value of the gain in the first range and controls, when the signs of the plurality of velocity-related values are the same, the gain using a value obtained by adding a constant value to the stored gain value or multiplying the stored gain value by the constant value. When the signs of the plurality of stored velocity values are the same, a direction of the velocity has not changed during that period. Therefore, in this case, it is considered that the user is in midst of moving the pointer from a certain position on the screen to a different position relatively distant therefrom and that a coarse motion operation in which accurate pointing is not performed is being made. In the case of a coarse motion operation, by adding or multiplying the constant value, the relationship between the movement of the input apparatus and the movement of the pointer becomes more linear, with the result that an operational feeling for the user can be improved.

Alternatively, the control means may control the gain using the stored gain value and the acceleration value of the casing when the signs of the plurality of velocity-related values are the same. In other words, in the case of a coarse motion operation, by performing control so that the relationship between the movement of the input apparatus and the movement of the pointer becomes more linear as the acceleration value increases, an operational feeling for the user can be improved.

The control means may control a value of the gain to be constant when the value of the increased gain exceeds the constant gain.

The input apparatus may further include an adjustment means for adjusting at least one of a change rate of the gain in the first range, the first threshold value, the second threshold value, and a value of the gain in the second range. As the adjustment means, a mechanical switch or a static switch, for example, only needs to be provided to the input apparatus. Alternatively, the input apparatus only needs to include software including GUI as the adjustment means. When the input apparatus includes such software, image information or the like of that GUI only needs to be transmitted to a control apparatus communicating with the input apparatus.

The movement signal output means includes an acceleration sensor that detects an acceleration of the casing in a direction along a predetermined axis, and a velocity calculation means for calculating, as the velocity-related value, the velocity value of the casing in the direction along the predetermined axis of the casing by integrating the detected acceleration value.

Alternatively, the movement signal output means includes a first acceleration sensor that detects a first acceleration in a direction along a first axis, a second acceleration sensor that detects a second acceleration in a direction along a second axis different from the direction along the first axis, and a velocity calculation means for calculating, by an integration operation that is based on the first acceleration and the second acceleration, a first velocity value of the casing in the direction along the first axis and a second velocity value in the direction along the second axis.

Alternatively, the movement signal output means includes an output means for outputting an angular velocity value of the casing about the predetermined axis, and an obtainment means for obtaining the velocity value calculated based on the output angular velocity value as the velocity-related value. A case where the output means includes an angle sensor, a case where the output means includes an angular velocity sensor, or a case where the output means includes an angular acceleration sensor is conceivable. A geomagnetic sensor is used as the angle sensor, and an angular velocity value is obtained by differentiating an angle value as a detection value thereof. The output means only needs to output the angular velocity value. The angular acceleration sensor is constituted as a combination of a plurality of acceleration sensors. When the output means includes the angular acceleration sensor, an angular acceleration value as a detection value thereof is integrated for outputting an angular velocity value.

The movement signal output means includes a first acceleration sensor that detects a first acceleration in a direction along a first axis, a first output means for outputting a first angle-related value as a value related to a rotational angle of the casing about a second axis different from the direction along the first axis, and a first calculation means for calculating a first velocity value of the casing in the direction along the first axis as the velocity-related value based on the first acceleration value and the first angle-related value.

When a human being operates the input apparatus naturally, the operation is made by at least one of a rotation from a base of an arm, bending of an elbow, and a turn of a wrist. Therefore, generation of an acceleration inevitably leads to generation of an angular acceleration in the same direction as the acceleration. Moreover, the same holds true for the velocity, and generation of a velocity inevitably leads to generation of an angular velocity in the same direction. In other words, the acceleration and the angular acceleration are correlated, and the velocity and the angular velocity are correlated. In the embodiment, information on one of the acceleration value and the angle-related value is used as an adminicle of the other information. Accordingly, accuracy in calculating velocity values can be improved. Although the first velocity value regarding the first axis has been calculated in the embodiment, it is also possible to calculate a second velocity value regarding a second axis as in the next embodiment.

In this case, the movement signal output means may include a second acceleration sensor that detects a second acceleration in a direction along the second axis, a second output means for outputting a second angle-related value as a value related to a rotational angle of the casing about the first axis, and a second calculation means for calculating a second velocity value of the casing in the direction along the second axis as the velocity-related value based on the second acceleration value and the second angle-related value. The first axis and the second axis do not always need to be orthogonal. When the first axis and the second axis are not orthogonal, the first acceleration value and the second acceleration value can be converted into those on the two orthogonal axes by an operation that uses a trigonometric function.

The angle-related value (first or second angle-related value) is typically an angular velocity value, but may be an angle value or an angular acceleration value.

In the case of the present embodiment, the control means only needs to independently perform control using the same (or different) gain profile(s) regarding the first velocity value and the second velocity value. Alternatively, the following configuration is also possible.

The control means variably controls the gain in a range in which an operational value obtained based on the first velocity value and the second velocity value that have been calculated ranges from a third threshold value to a fourth threshold value larger than the third threshold value, and controls the gain to be constant in a range in which the operational value exceeds the fourth threshold value.

The operational value is a value obtained by a predetermined operational expression using the first velocity value and the second velocity value. The operational expression can be changed as appropriate.

The input apparatus further includes a comparison means for comparing the first velocity value and the second velocity value that have been calculated, and the control means controls the gain with respect to a larger one of the first velocity value and the second velocity value as a result of the comparison. Accordingly, a calculation amount can be reduced as compared to a case where the operational value is used as described above or the gain is controlled independently for the first velocity value and the second velocity value, for example.

According to an embodiment, there is provided a control apparatus controlling a movement of a pointer on a screen based on information on a detection value transmitted from an input apparatus including a casing, a detection means for detecting a movement of the casing, and a transmission means for transmitting the information on the detection value obtained by the detection means, the control apparatus including a reception means, a movement signal output means, a gain means, a control means, and a coordinate information generation means.

The reception means receives the information on the detection value.

The movement signal output means outputs a signal corresponding to a velocity-related value that is related to a velocity of the casing.

The gain means obtains a pointer velocity value as a velocity value for moving the pointer on the screen by multiplying the output velocity-related value by a gain.

The control means variably controls the gain in a first range in which the output velocity-related value ranges from a first threshold value to a second threshold value larger than the first threshold value, and controls the gain to be constant in a second range in which the output velocity-related value exceeds the second threshold value.

The coordinate information generation means generates coordinate information of the pointer on the screen that corresponds to the pointer velocity value obtained by the gain means.

The control apparatus may further include a determination means for determining a size of an icon on the screen and an adjustment means for adjusting, in accordance with the size of an icon determined by the determination means, at least one of a change rate of the gain in the first range, the first threshold value, the second threshold value, and a value of the gain in the second range. The icon used herein is an image on the screen 3 representing a function of a program, a program content, an execution command, a file content, and the like of a computer. In this case, a processor of the control apparatus mainly assumes the function of the adjustment means.

According to an embodiment, there is provided a control system controlling a movement of a pointer on a screen, including an input apparatus and a control apparatus.

The input apparatus includes a casing, a movement signal output means, a gain means, a control means, and a transmission means. The movement signal output means outputs a signal corresponding to a velocity-related value that is related to a velocity of the casing. The gain means obtains a pointer velocity value as a velocity value for moving the pointer by multiplying the output velocity-related value by a gain. The control means variably controls the gain in a first range in which the output velocity-related value ranges from a first threshold value to a second threshold value larger than the first threshold value, and controls the gain to be constant in a second range in which the output velocity-related value exceeds the second threshold value. The transmission means transmits information on the pointer velocity value obtained by the gain means.

The control apparatus includes a reception means and a coordinate information generation means. The reception means receives the transmitted information on the pointer velocity value. The coordinate information generation means generates coordinate information of the pointer on the screen that corresponds to the received pointer velocity value.

According to another embodiment, there is provided a control system in which an input apparatus includes a casing, a detection means for detecting a movement of the casing, and a transmission means for transmitting information on a detection value obtained by the detection means. A control apparatus includes a reception means for receiving the transmitted information on the detection value, a movement signal output means for outputting a signal corresponding to a velocity-related value that is related to a velocity of the casing based on the received information on the detection value, a gain means for obtaining a pointer velocity value as a velocity value for moving the pointer by multiplying the output velocity-related value by a gain, a control means for variably controlling the gain in a first range in which the output velocity-related value ranges from a first threshold value to a second threshold value larger than the first threshold value, and controlling the gain to be constant in a second range in which the output velocity-related value exceeds the second threshold value, and a coordinate information generation means for generating coordinate information of the pointer on the screen that corresponds to the pointer velocity value obtained by the gain means.

According to an embodiment, there is provided a control method including: detecting a movement of an input apparatus; outputting a signal corresponding to a velocity-related value that is related to a velocity of the input apparatus; variably controlling a gain for determining a pointer velocity value as a velocity value for moving a pointer on a screen, in a first range in which the output velocity-related value ranges from a first threshold value to a second threshold value larger than the first threshold value; controlling the gain to be constant in a second range in which the output velocity-related value exceeds the second threshold value; outputting the pointer velocity value by multiplying the output velocity-related value by the controlled gain; and generating coordinate information of the pointer on the screen that corresponds to the pointer velocity value.

According to an embodiment, there is provided a handheld apparatus controlling a movement of a pointer on a screen, including a casing, a display section, a movement signal output means, a gain means, and a control means.

The display section displays the screen. The movement signal output means detects a movement of the casing and outputs a signal of a velocity-related value that is related to a velocity of the casing. The gain means obtains a pointer velocity value as a velocity value for moving the pointer on the screen by multiplying the output velocity-related value by a gain. The control means variably controls the gain in a first range in which the output velocity-related value ranges from a first threshold value to a second threshold value larger than the first threshold value, and controls the gain to be constant in a second range in which the output velocity-related value exceeds the second threshold value.

Additional features and advantages are described herein, and will be apparent from, the following Detailed Description and the figures.

BRIEF DESCRIPTION OF THE FIGURES

FIG. 14(B) is a pointer velocity profile obtained by the gain profile of FIG. 14(A).

DETAILED DESCRIPTION

As described above, according to the embodiments, a user can feel a linearity between a movement of an input apparatus and that of a pointer, and an accurate pointing operation becomes possible.

Hereinafter, embodiments will be described with reference to the drawings.

Figure 1:
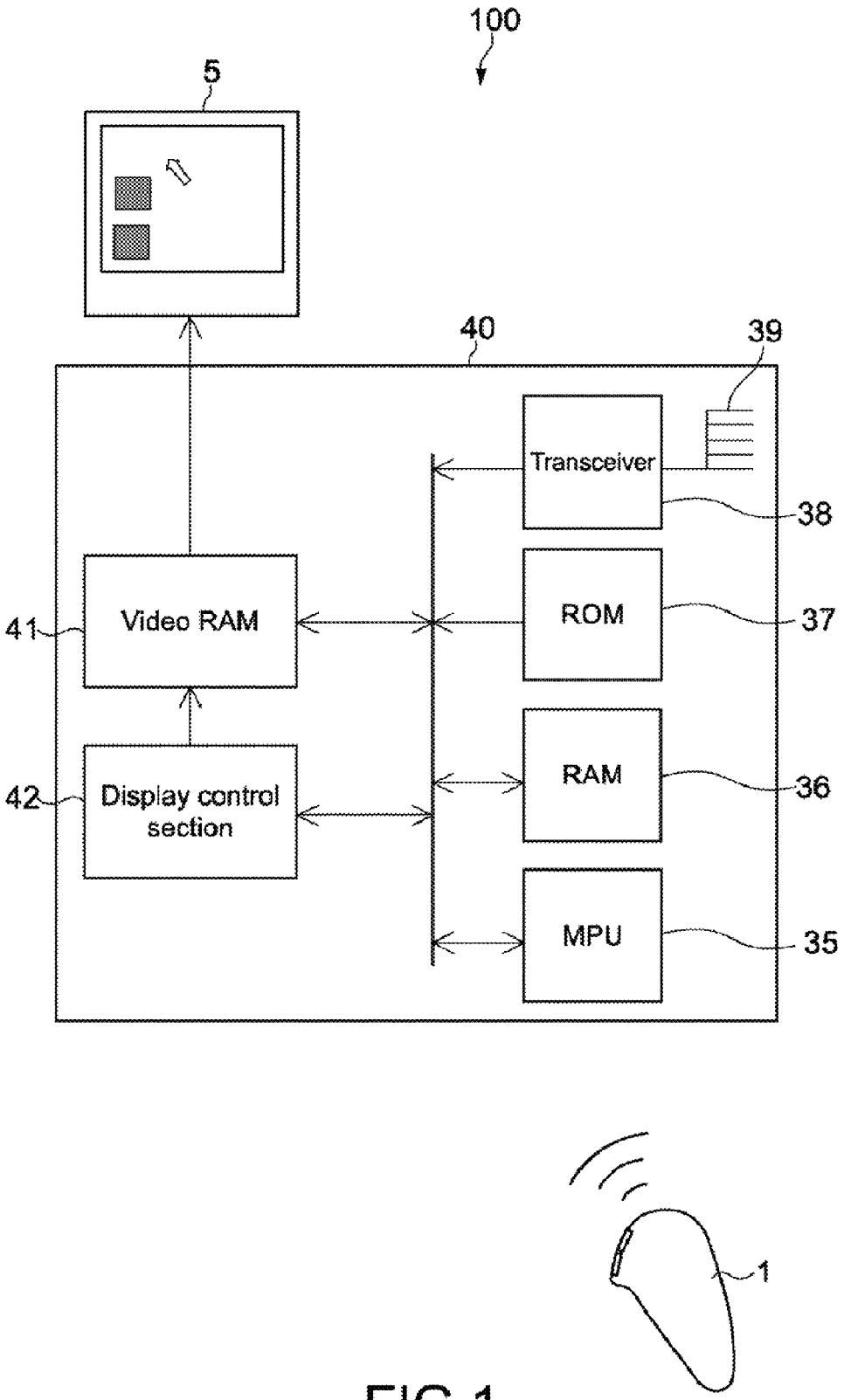
FIG. 1 A diagram showing a control system according to an embodiment.

FIG. 1 is a diagram showing a control system according to an embodiment. A control system 100 includes a display apparatus 5, a control apparatus 40, and an input apparatus 1.

Figure 2:
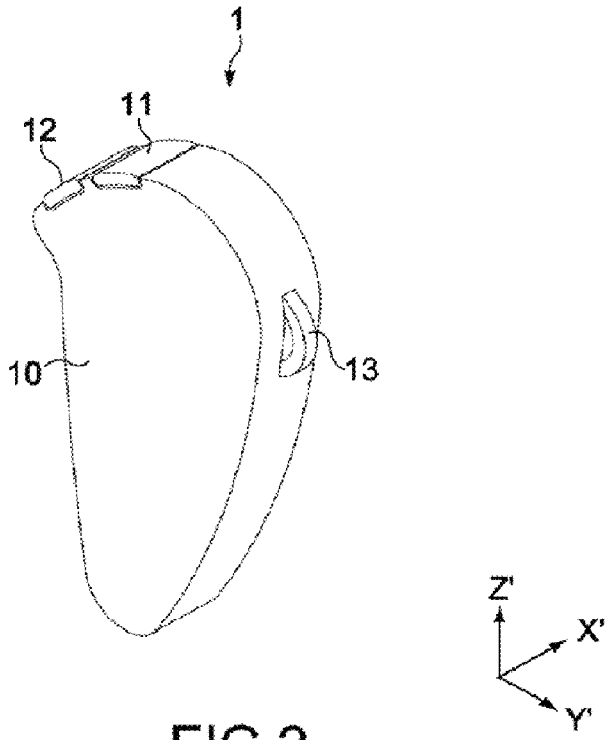
FIG. 2 A perspective diagram showing an input apparatus.

FIG. 2 is a perspective diagram showing the input apparatus 1. The input apparatus 1 is of a size that a user is capable of holding. The input apparatus 1 includes a casing 10 and operation sections including two buttons 11 and 12 provided at an upper portion of the casing 10, a rotary wheel button 13, and the like, for example. The button 11 disposed closer to the center of the upper portion of the casing 10 functions as a left button of a mouse as an input device for a PC, for example, and the button 12 adjacent to the button 11 functions as a right button of a mouse.

For example, a "drag and drop" operation may be executed by moving the input apparatus 1 while pressing the button 11, a file may be opened by double-clicking the button 11, and a screen 3 may be scrolled by the wheel button 13. Locations of the buttons 11 and 12 and the wheel button 13, a content of a command issued, and the like can arbitrarily be changed.

Figure 3:
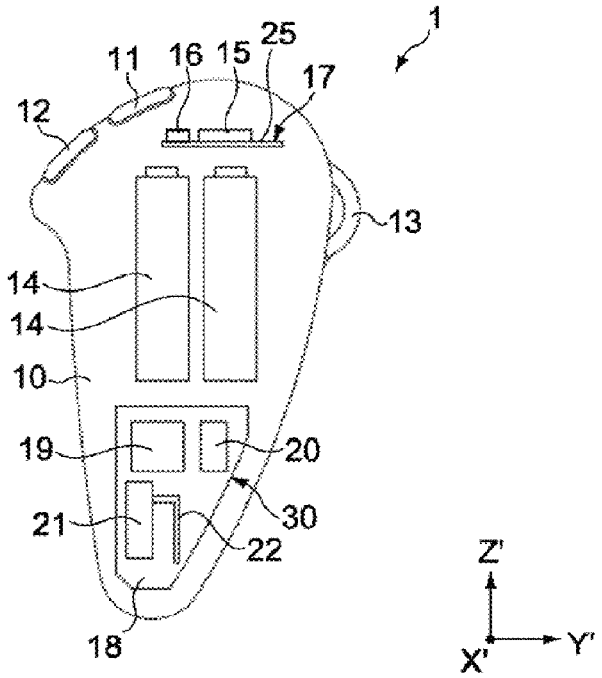
FIG. 3 A diagram schematically showing an internal structure of the input apparatus.
Figure 4:
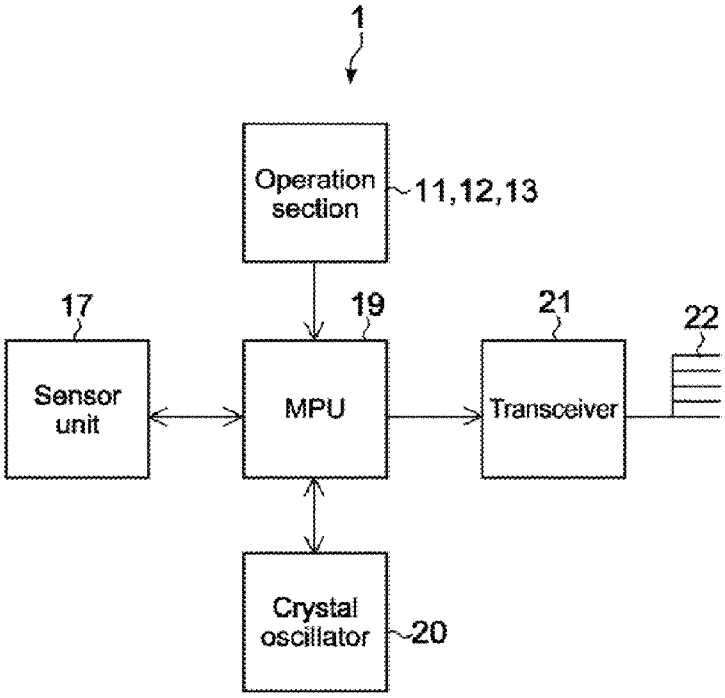
FIG. 4 A block diagram showing an electrical structure of the input apparatus.

FIG. 3 is a diagram schematically showing an internal structure of the input apparatus 1. FIG. 4 is a block diagram showing an electrical structure of the input apparatus 1.

The input apparatus 1 includes a sensor unit 17, a control unit 30, and batteries 14.

Figure 8:
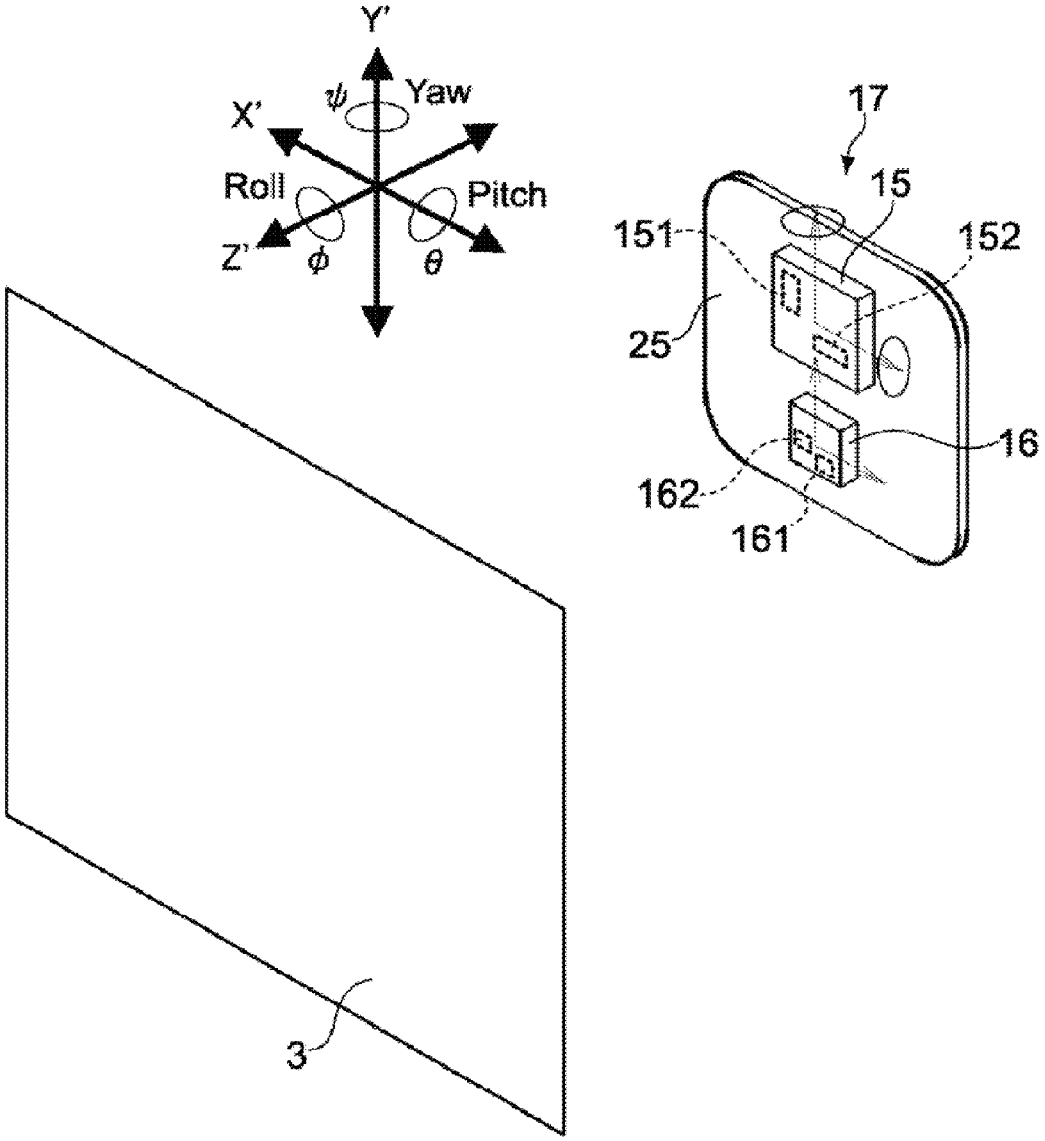
FIG. 8 A perspective diagram showing a sensor unit.

FIG. 8 is a perspective diagram showing the sensor unit 17.

The sensor unit 17 includes an acceleration sensor unit 16 for detecting accelerations in different angles such as along two orthogonal axes (X' axis and Y' axis). Specifically, the acceleration sensor unit 16 includes two sensors, that is, an acceleration sensor 16 for a yaw direction and an acceleration sensor 162 for a pitch direction.

The sensor unit 17 further includes an angular velocity sensor unit 15 for detecting angular accelerations about the two orthogonal axes. Specifically, the angular velocity sensor unit 15 includes two sensors, that is, an angular velocity sensor 151 for a yaw direction and an angular velocity sensor 152 for a pitch direction. The acceleration sensor unit 16 and the angular velocity sensor unit 15 are packaged and mounted on a circuit board 25.

As each of the angular velocity sensors 151 and 152 for the yaw and pitch directions, respectively, a vibration gyro sensor for detecting Coriolis force in proportion to an angular velocity is used. As each of the acceleration sensors 161 and 162 for the X- and Y-axis directions, respectively, any sensor such as a piezoresistive sensor, a piezoelectric sensor, or a capacitance sensor may be used. The angular velocity sensor 151 or 152 is not limited to the vibration gyro sensor, and a rotary top gyro sensor, a ring laser gyro sensor, a gas rate gyro sensor, and the like may also be used.

In descriptions on FIGS. 2 and 3, a longitudinal direction of the casing 10 is referred to as Z' direction, a thickness direction of the casing 10 is referred to as X' direction, and a width direction of the casing 10 is referred to as Y' direction for convenience. In this case, the sensor unit 17 is incorporated into the casing 10 such that a surface of the circuit board 25 on which the acceleration sensor unit 16 and the angular velocity sensor unit 15 are mounted becomes substantially parallel to an X'-Y' plane. As described above, the sensor units 16 and 15 each detect physical amounts with respect to the two axes, that is, the X axis and the Y axis. In the specification, a coordinate system that moves along with the input apparatus 1, that is, a coordinate system fixed to the input apparatus 1 is expressed using the X' axis, Y' axis, and Z' axis, whereas a coordinate system stationary on earth, that is, an inertial coordinate system is expressed using the X axis, Y axis, and Z axis. Further, in descriptions below, with regard to a movement of the input apparatus 1, a rotational direction about the X' axis is sometimes referred to as pitch direction, a rotational direction about the Y' axis is sometimes referred to as yaw direction, and a rotational direction about the Z' axis (roll axis) direction is sometimes referred to as roll direction.

The control unit 30 includes a main substrate 18, an MPU 19 (Micro Processing Unit) (or CPU) mounted on the main substrate 18, a crystal oscillator 20, a transceiver 21, and an antenna 22 printed on the main substrate 18.

The MPU 19 includes a built-in volatile or nonvolatile memory requisite therefor. The MPU 19 is input with a detection signal from the sensor unit 17, an operation signal from the operation sections, and the like, and executes various kinds of operational processing in order to generate predetermined control signals in response to those input signals. The memory may be provided separate from the MPU 19.

Typically, the sensor unit 17 outputs analog signals. In this case, the MPU 19 includes an A/D (Analog/Digital) converter. Alternatively, the sensor unit 17 may be a unit that includes the A/D converter.

The MPU 19 alone or the MPU 19 and the crystal oscillator 20 constitutes/constitute a processing unit.

The transceiver 21 (transmission means) transmits, as RF radio signals, a control signal generated in the MPU 19 to the control apparatus 40 via the antenna 22. The transceiver 21 is also capable of receiving various signals transmitted from the control apparatus 40.

The crystal oscillator 20 generates clocks and supplies them to the MPU 19. As the batteries 14, dry cell batteries, rechargeable batteries, and the like are used.

The control apparatus 40 includes an MPU 35 (or CPU), a RAM 36, a ROM 37, a video RAM 41, a display control section 42, an antenna 39, and a transceiver 38.

The transceiver 38 receives the control signal transmitted from the input apparatus 1 via the antenna 39 (reception means). The transceiver 38 is also capable of transmitting various predetermined signals to the input apparatus 1. The MPU 35 analyzes the control signal and executes various kinds of operational processing. The display control section 42 mainly generates screen data to be displayed on the screen 3 of the display apparatus 5 under control of the MPU 35. The video RAM 41 as a working area of the display control section 42 temporarily stores the generated screen data.

The control apparatus 40 may be an apparatus dedicated to the input apparatus 1, or may be a PC or the like. The control apparatus 40 is not limited to the apparatus dedicated to the input apparatus 1, and may be a computer integrally formed with the display apparatus 5, audiovisual equipment, a projector, a game device, a car navigation system, or the like.

Examples of the display apparatus 5 include a liquid crystal display and an EL (Electro-Luminescence) display, but are not limited thereto. The display apparatus 5 may alternatively be an apparatus integrally formed with a display and capable of receiving television broadcasts and the like, or an apparatus in which such a display and the control apparatus 40 are integrated.

Figure 5:
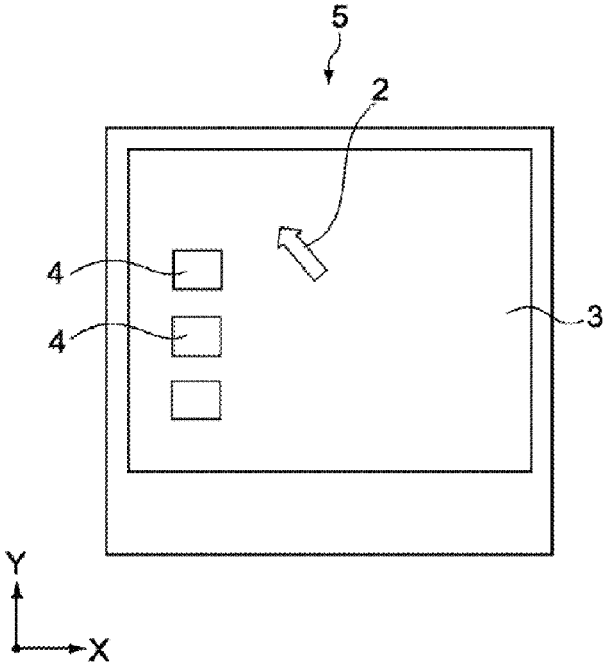
FIG. 5 A diagram showing an example of a screen displayed on a display apparatus.

FIG. 5 is a diagram showing an example of the screen 3 displayed on the display apparatus 5. UIs such as icons 4 and a pointer 2 are displayed on the screen 3. The icons are images on the screen 3 representing functions of programs, program contents, execution commands, file contents, and the like of the computer. It should be noted that on the screen 3, the horizontal direction is referred to as X-axis direction and the vertical direction is referred to as Y-axis direction.

Figure 6:
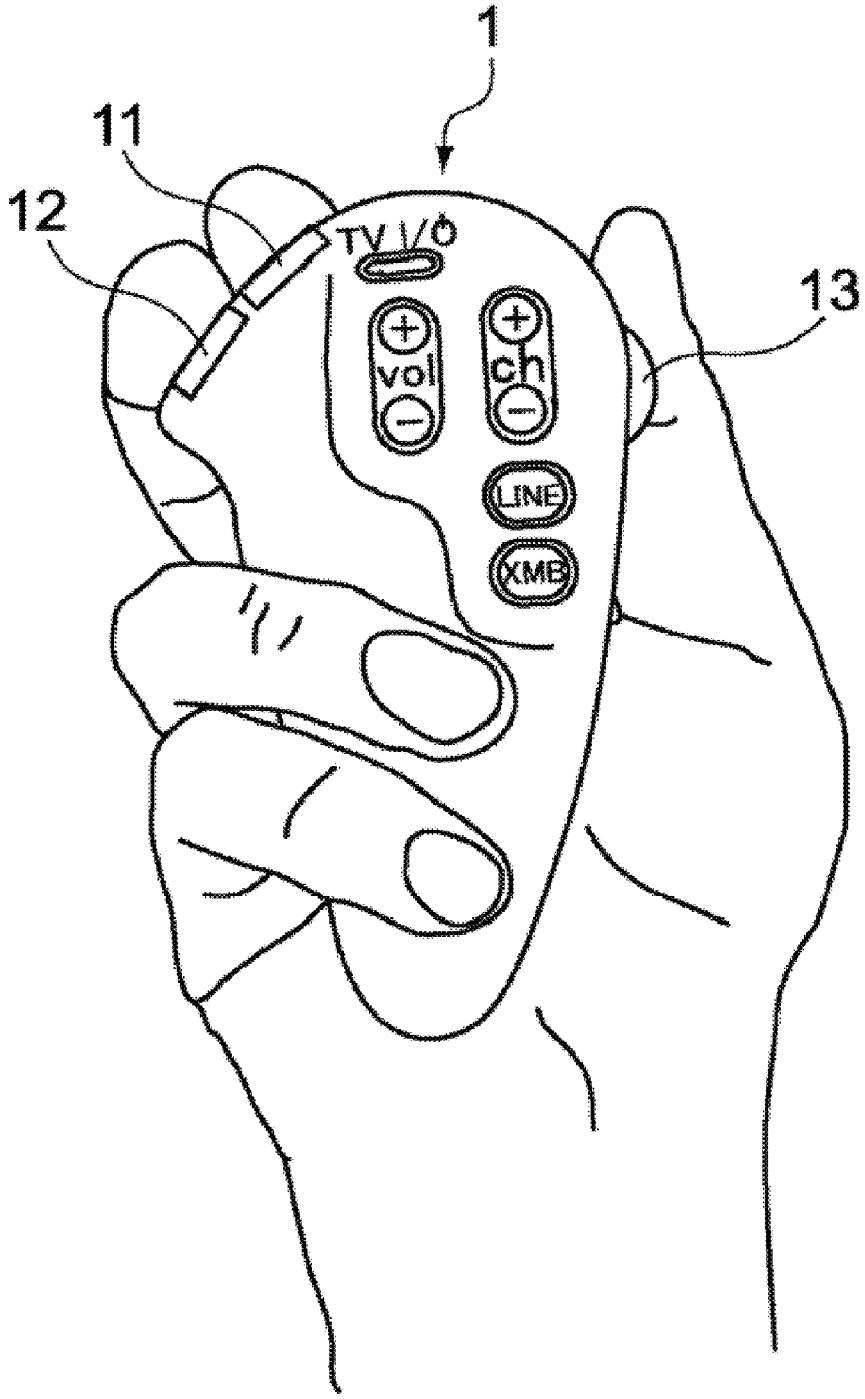
FIG. 6 A diagram showing a state where a user is holding the input apparatus 1.

FIG. 6 is a diagram showing a state where a user is holding the input apparatus 1. As shown in FIG. 6, the input apparatus 1 may include, in addition to the buttons 11, 12, and 13, various operation buttons such as those provided to a remote controller for operating a television or the like and a power supply switch, for example. When the user moves the input apparatus 1 in the air or operates the operation sections while holding the input apparatus 1 as shown in the figure, input information thereof is output to the control apparatus 40, and the control apparatus 40 controls the UI.

Figure 7:
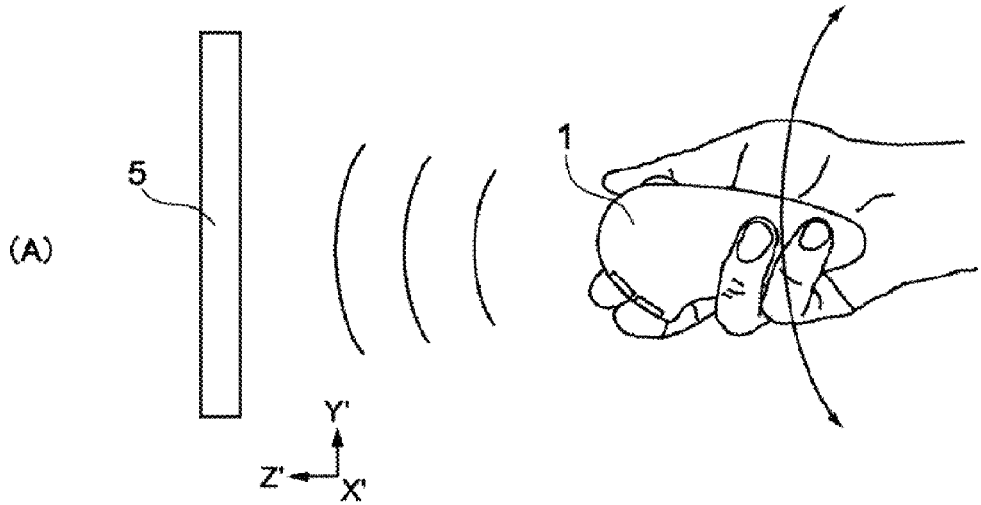
FIG. 7 Explanatory diagrams showing typical examples of ways of moving the input apparatus and ways a pointer moves on the screen accordingly.
Figure 7:
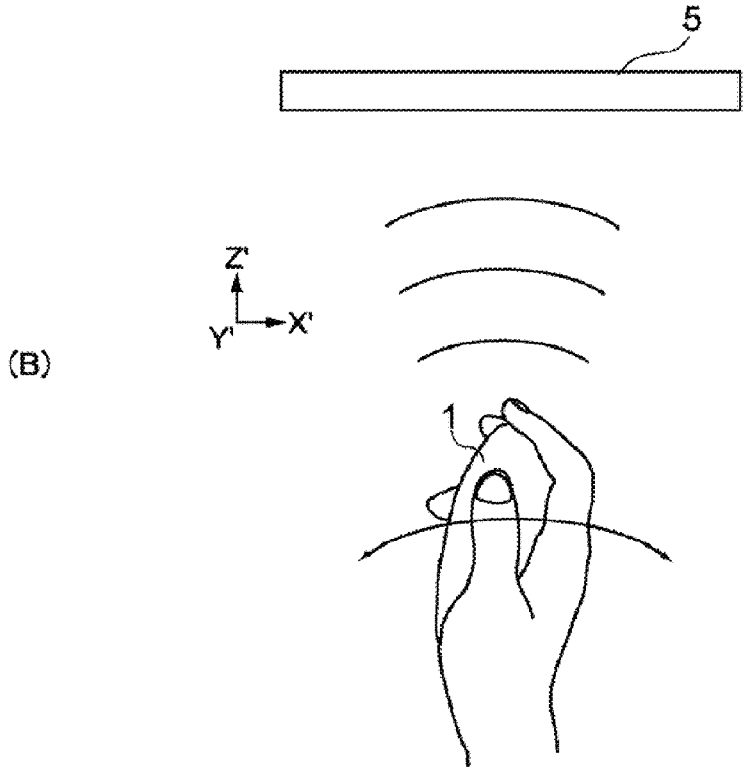

Next, a description will be given on typical examples of ways of moving the input apparatus 1 and ways the pointer 2 moves on the screen 3 accordingly. FIG. 7 are explanatory diagrams therefor.

As shown in FIGS. 7(A) and 7(B), the user holds the input apparatus 1 so as to aim the buttons 11 and 12 side of the input apparatus 1 at the display apparatus 5 side. The user holds the input apparatus 1 so that a thumb is located on an upper side and a pinky is located on a lower side as in handshakes. In this state, the circuit board 25 of the sensor unit 17 (see FIG. 8) is close to being in parallel with the screen 3 of the display apparatus 5, and the two axes as detection axes of the sensor unit 17 respectively correspond to the horizontal axis (X axis) and the vertical axis (Y axis) on the screen 3. Hereinafter, the position of the input apparatus 1 as shown in FIGS. 7(A) and 7(B) will be referred to as reference position.

As shown in FIG. 7(A), in the reference position, the user swings a wrist or an arm in the vertical direction, that is, the pitch direction. At this time, the acceleration sensor 162 for the Y'-axis direction detects an acceleration $a_y$ in the Y'-axis direction, and the angular velocity sensor 152 for the pitch direction detects an angular velocity $\omega_\theta$ about the X' axis. Based on those detection values, the control apparatus 40 controls display of the pointer 2 so that the pointer 2 moves in the Y-axis direction.

Meanwhile, as shown in FIG. 7(B), in the reference position, the user swings the wrist or the arm in the lateral direction, that is, the yaw direction. At this time, the acceleration sensor 161 for the X'-axis direction detects an acceleration $a_x$ in the X'-axis direction, and the angular velocity sensor 151 for the yaw direction detects an angular velocity $\omega_\psi$ about the Y' axis. Based on those detection values, the control apparatus 40 controls display of the pointer 2 so that the pointer 2 moves in the X-axis direction.

Figure 9:
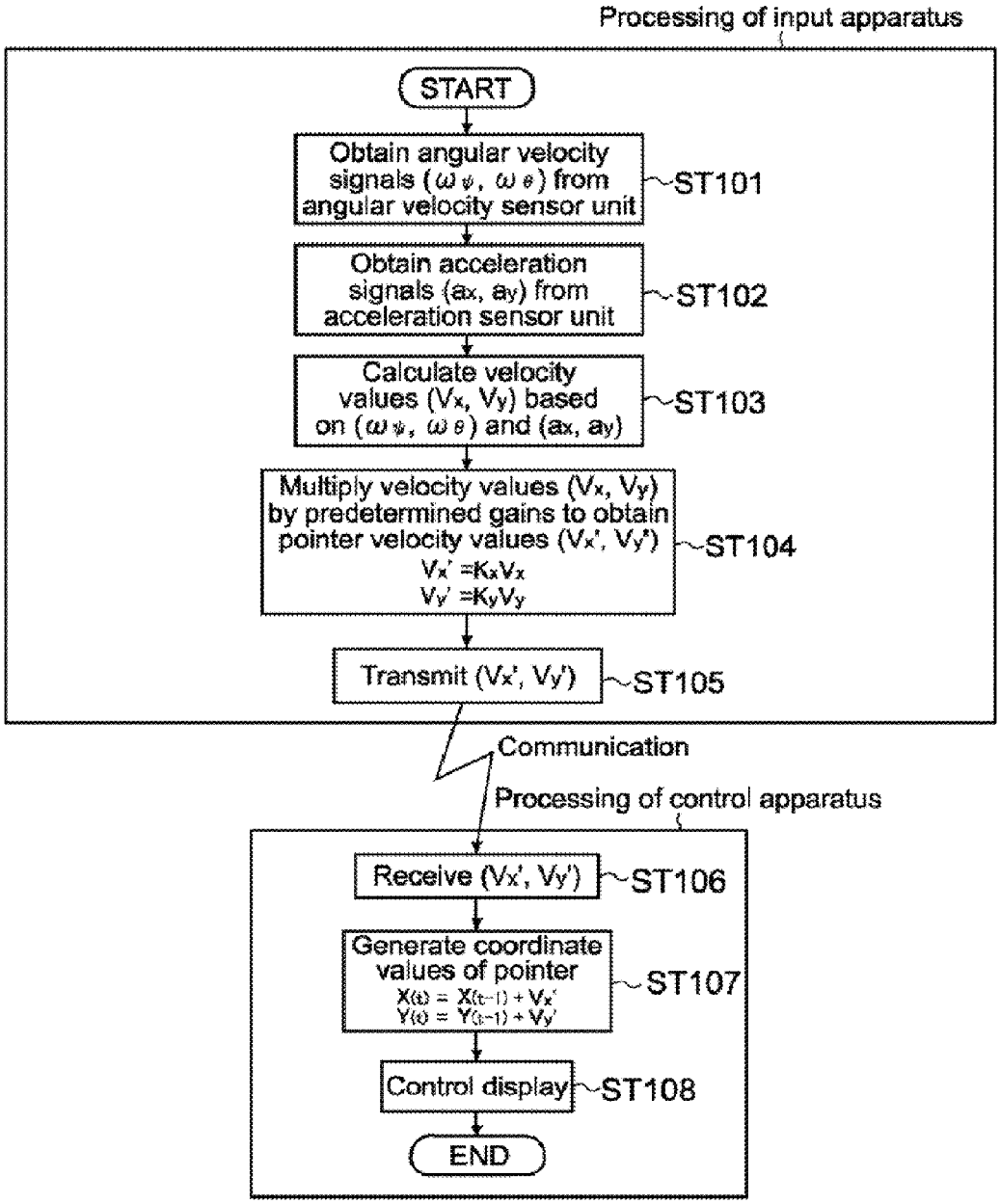
FIG. 9 A flowchart showing an operation of the control system according to the embodiment.

Next, an operation of the control system 100 structured as described above will be described. FIG. 9 is a flowchart showing the operation.

Power of the input apparatus 1 is turned on. By the user pressing the power supply switch or the like provided to the input apparatus 1 or the control apparatus 40, for example, the power of the input apparatus 1 is turned on. When the power is turned on, biaxial angular velocity signals are output from the angular velocity sensor unit 15. The MPU 19 obtains a first angular velocity value $\omega_\psi$ and a second angular velocity value $\omega_\theta$ from the biaxial angular velocity signals (Step 101).

Further, upon turning on the power of the input apparatus 1, biaxial acceleration signals are output from the acceleration sensor unit 16. The MPU 19 obtains a first acceleration value $a_x$ and a second acceleration value $a_y$ from the biaxial acceleration signals (Step 102). The signals on the acceleration values are signals corresponding to the position of the input apparatus 1 at a point when the power is turned on (hereinafter, referred to as initial position). Hereinafter, the initial position will be described as being the reference position unless stated otherwise as will be described later. It should be noted that the MPU 19 typically carries out Steps 101 and 102 in sync every predetermined clock cycle.

It should be noted that in FIG. 9 and the like, the acceleration signals are obtained by the acceleration sensor unit after the angular velocity signals are obtained by the angular velocity sensor unit. However, the order is not limited thereto, and the angular velocity signals may be obtained after the acceleration signals are obtained, or the acceleration signals and the angular velocity signals may be obtained in parallel (at the same time) (the same holds true for FIGS. 15, 16, and 17 below).

Based on the acceleration values ($a_x$, $a_y$) and the angular velocity values ($\omega_\psi$, $\omega_\theta$), the MPU 19 calculates velocity values (first velocity value $V_x$, second velocity value $V_y$) by a predetermined operation (Step 103). The first velocity value $V_x$ is a velocity value in a direction along the X axis and the second velocity value $V_y$ is a velocity value in a direction along the Y axis. A velocity value calculation method will be described later in detail. In this point, at least the sensor unit 17 alone or the MPU 19 and the sensor unit 17 functions/function as a movement signal output means for outputting a velocity-related value as a movement signal of the input apparatus 1. In this embodiment, the velocity value will be exemplified as the velocity-related value.

As the method of calculating the velocity values ($V_x$, $V_y$), in this embodiment, the MPU 19 divides the acceleration values ($a_x$, $a_y$) by angular acceleration values ($\Delta\omega_\psi$, $\Delta\omega_\theta$) to thus obtain radius gyrations ($R_\psi$, $R_\theta$) of the movement of the input apparatus 1. In this case, the velocity values ($V_x$, $V_y$) can be calculated by multiplying the radius gyrations ($R_\psi$, $R_\theta$) by the angular velocity values ($\omega_\psi$, $\omega_\theta$). The radius gyrations ($R_\psi$, $R_\theta$) may also be obtained by dividing acceleration change rates ($\Delta a_x$, $\Delta a_y$) by angular acceleration change rates ($\Delta(\Delta\omega_\psi)$, $\Delta(\Delta\omega_\theta)$).

By calculating the velocity values by the calculation method described above, an operational feeling of the input apparatus 1 that matches an intuition of the user can be obtained, and moreover, the movement of the pointer 2 on the screen 3 also accurately matches the movement of the input apparatus 1.

It should be noted that the velocity values ($V_x$, $V_y$) do not always need to be calculated by the calculation method above. For example, the MPU 19 may calculate the velocity values by, for example, integrating the acceleration values ($a_x$, $a_y$) while using the angular velocity values ($\omega_\psi$, $\omega_\theta$) as an adminicle for the integration operation. Alternatively, it is also possible for the velocity values ($V_x$, $V_y$) to be calculated by simply integrating the acceleration values ($a_x$, $a_y$). Alternatively, the detected angular velocity values ($\omega_\psi$, $\omega_\theta$) may be used as they are as the velocity values ($V_x$, $V_y$) of the casing. It is also possible to obtain angular acceleration values ($\Delta\omega_\psi$, $\Delta\omega_\theta$) by temporally differentiating the detected angular velocity values ($\omega_\psi$, $\omega_\theta$), and use them as the acceleration values of the casing.

As expressed in Equations (1) and (2) below, the MPU 19 multiplies the calculated velocity values ($V_x$, $V_y$) by predetermined gain values ($K_x$, $K_y$) to thus obtain velocity values ($V_x'$, $V_y'$) (pointer velocity values) for moving the pointer on the screen (Step 104).

$$V_x'=K_x*V_x \tag{1}$$

$$V_y'=K_y*V_y \tag{2}$$

The MPU 19 transmits information on the obtained pointer velocity values ($V_x'$, $V_y'$) to the control apparatus 40 via the transceiver 21 and the antenna 22 (Step 105).

The MPU 35 of the control apparatus 40 receives the information on the pointer velocity values ($V_x'$, $V_y'$) via the antenna 39 and the transceiver 38 (Step 106). The input apparatus 1 transmits the pointer velocity values ($V_x'$, $V_y'$) every predetermined clocks, that is, per unit time, so the control apparatus 40 can receive this and obtain displacement amounts in the X- and Y-axis directions per unit time.

The MPU 35 generates coordinate values (X(t), Y(t)) of the pointer 2 on the screen 3 that correspond to the obtained displacement amounts in the X- and Y-axis directions per unit time by Equations (3) and (4) below (Step 107). Based on the generated coordinate values, the MPU 35 controls display so that the pointer 2 moves on the screen 3 (Step 108) (coordinate information generation means).

$$X(t)=X(t-1)+V_x' \tag{3}$$

$$Y(t)=Y(t-1)+V_y' \tag{4}$$

FIG. 10(A) is a graph showing a profile of the gain value(s) $K_x$ and/or $K_y$ of Equation (s) (1) and/or (2) above. In FIG. 10(A), an abscissa axis represents the velocity value(s) $V_x$ and/or $V_y$ of the input apparatus 1 obtained in Step 103, and an ordinate axis represents the gain value(s) $K_x$ and/or $K_y$. In other words, the gain value(s) $K_x$ and/or $K_y$ are functions of the velocity value(s) $V_x$ and/or $V_y$, respectively.

In descriptions below, unless limitedly stated otherwise, the abscissa axis represents one of the velocity values $V_x$ and $V_y$ and the ordinate axis represents the gain value K with respect to that one of the velocity values $V_x$ and $V_y$ in the gain profile as shown in FIG. 10(A).

In the example shown in FIG. 10(A), the MPU 19 functions as a controls means for variably controlling the gain value K in a range from a threshold value v1 (first threshold value) to a threshold value v2 (second threshold value) (first range) in which the input apparatus 1 is in a low-velocity range, and controlling the gain value K to be constant in a range exceeding the second threshold value v2 (second range).

When resolution performance of the velocity value on the abscissa axis is expressed by an absolute value of ±128 (8 bits), the threshold value v1 is set to be 4 to 12 or 6 to 10, typically 8. Moreover, the threshold value v2 is set to be 10 to 20 or 12 to 16, typically 14. However, the threshold values v1 and v2 are not limited to those ranges and can be changed as appropriate. The resolution performance of the velocity value on the abscissa axis may be 8 bits or less or larger than 8 bits.

A velocity equal to or smaller than the threshold value v2 typically becomes 5 cm/s or less when converted into an actual velocity of the input apparatus 1, but settings can be changed as appropriate to 10 cm/s or less, 3 cm/s or less, or other ranges (e.g., 2 go 4 cm/s). A relatively-high-velocity range of the input apparatus 1 refers to a case exceeding 10 cm/s or a case exceeding 20 cm/s, for example, but settings thereof can also be changed as appropriate.

FIG. 10(B) is a graph showing a profile of the velocity value for moving the pointer 2 on the screen 3, that is obtained by the gain profile shown in FIG. 10(A) (hereinafter, referred to as velocity profile). As in FIG. 10(A), the abscissa axis represents the velocity value(s) $V_x$ and/or $V_y$ of the input apparatus 1 obtained in Step 103. A graph obtained by temporally differentiating the velocity profile of FIG. 10(B) becomes the graph of the gain profile of FIG. 10(A). The gain is a value with the velocity value $V_x$ or $V_y$ of the input apparatus 1 as an input and the pointer velocity value ($V_x'$, $V_y'$) as an output.

As shown in FIG. 10(B), when the velocity value $V_x$ or $V_y$ of the input apparatus 1 is 0, a gain value K1 is, for example, 0.2 to 0.4, that is, an output/input is set to be 0.2 to 0.4, though not limited to this range. A constant gain value K2 is set to 1 but may be other values. This is because as long as the gain value K2 is a constant value, the velocity value of the input apparatus 1 and the pointer velocity value correspond linearly.

The MPU 19 only needs to store functions expressing the gain profile in the memory and use the functions to dynamically calculate the pointer velocity values. Alternatively, a lookup table generated based on the gain profile, that shows a correspondence between the velocity value $V_x$ or $V_y$ of the input apparatus 1 and the pointer velocity value, may be stored in the memory in advance. The same holds true for other gain profiles to be described later (FIGS. 11(A) and 12(A)).

As described above, the gain value K is controlled variably in a relatively-low-velocity range in which the velocity value $V_x$ or $V_y$ of the input apparatus 1 is equal to or smaller than the threshold value v2. For example, in this embodiment, the gain value K is set to increase as the velocity value $V_x$ or $V_y$ of the input apparatus 1 increases in the range in which the velocity value of the input apparatus 1 ranges from v1 to v2. Therefore, it becomes possible for the user to perform accurate pointing in the range in which the velocity of the movement of the input apparatus is relatively low. Moreover, the gain value K is controlled to be constant in the relatively-high-velocity range in which the velocity value $V_x$ or $V_y$ of the input apparatus 1 exceeds the threshold value v2. Therefore, the movement of the input apparatus 1 and that of the pointer 2 correspond linearly in the range in which the velocity value $V_x$ or $V_y$ of the input apparatus 1 is relatively high, with the result that an operational feeling for the user is improved.

To put is the other way around, the range in which the velocity value $V_x$ or $V_y$ of the input apparatus 1 is relatively low is a range in which, even when the velocity profile is not linear, the user cannot judge whether it is linear or not. Specifically, that range is typically 5 cm/s or less as described above.

Further, the MPU 19 controls the gain to be constant in a range in which the velocity value of the input apparatus 1 ranges from 0 to the threshold value v1 (third range). Since the movement of the pointer 2 becomes linear in accordance with an operation at a start of the movement of the input apparatus 1 (instant the input apparatus starts moving) as described above, the pointer 2 starts moving smoothly.

Here, in the typical example of FIG. 10(A), the gain value K in the range from the threshold value v1 to the threshold value v2 increases linear-functionally. Instead, a case of an increase by a multi-degree function of quadratic or more, a case of a stepwise increase, an increase by a combination of at least two of the above, or other ways to increase is also possible. The multi-degree function of quadratic or more is of course not limited to a downwardly-convex function, and may be an upwardly-convex function or a combination of those. The same holds true for the case of the multi-degree function of quadratic or more hereinbelow.

FIG. 11(A) is a graph showing a gain profile according to another embodiment. In this gain profile, the threshold value v1 shown in FIG. 10(A) is set to 0. Due to such a gain profile, a velocity profile shown in FIG. 11(B) increases smoothly from a 0 velocity value of the input apparatus 1. Accordingly, the user does not feel a stress in the low-velocity range.

Moreover, in the gain profile shown in FIG. 11(A), a function from v1 (=0) to v2 is a multi-degree function of quadratic or more. However, this part may be a straight line as shown in FIG. 10(A).

FIG. 12(A) is a graph showing a gain profile according to still another embodiment. FIG. 12(B) is a graph showing a velocity profile obtained by the gain profile shown in FIG. 12(A).

In this example, the gain profile is set based on the acceleration value of the input apparatus 1, and in a range from the threshold value v1 (=0) to the threshold value v2, the gain profile moves farther away from a gain profile that is located at the very bottom and indicated by a thick line F to come closer to 1 (or vicinity of 1) as indicated by broken lines as the acceleration value of the input apparatus increases. In other words, the threshold value v2 shifts more to the low-velocity side as the acceleration value increases.

The threshold value v1 may be a value other than 0. Although the gain in the range from the threshold value v1 (=0) to the threshold value v2 is a multi-degree function of quadratic or more, it may instead be a straight line.

The MPU 19 sets an operational value obtained based on the gain value K corresponding to the velocity values ($V_x$, $V_y$) (previous gain value K) (first gain value) and functions ($f(a_{xi})$, $f(a_{yi})$) of acceleration values ($a_{xi}$, $a_{yi}$) obtained by differentiating the velocity values $V_x$, $V_y$, as a new gain value K (second gain value) in place of the previous gain value K.

Hereinafter, the acceleration value $a_{xi}$ or $a_{yi}$ may simply be referred to as acceleration value $a_i$, and the function $f(a_{xi})$ or $f(a_{yi})$ may simply be referred to as $f(a_i)$.

The function $f(a_i)$ can be made a function that increases as the acceleration value $a_i$ increases. The way it increases is linear-functionally, by a multi-degree function of quadratic or more, stepwise, by a combination of at least two of the above, or by various other ways. The function $f(a_i)$ only needs to be set while considering a balance between awkwardness of a user in operating the input apparatus 1 at a high acceleration and operability of accurate pointing through a user test, for example.

The operational value is a value obtained by adding the function $f(a_i)$ to the previous gain value K or multiplying the previous gain value K by the function $f(a_i)$. FIG. 12(A) shows a case where the operation value is obtained by adding the function $f(a_i)$ to the previous gain value K. Accordingly, the gain profile as shown in FIG. 12(A) can be obtained. In other words, as indicated by broken lines, the gain value K approaches 1 (or vicinity of 1) from a gain value indicated by a thick line F as the acceleration value $a_i$ increases. In other words, the threshold value v2 shifts more to the low-velocity side as the acceleration value increases.

The function $f(a_i)$ may be a function that decreases as the acceleration value $a_i$ increases. In this case, the operational value can be obtained by dividing the previous gain value K by the function $f(a_i)$.

Moreover, it is also possible to adopt a method of registering relationships among velocity values, acceleration values, and gain values in a table in advance and obtaining a corresponding gain value based on a velocity value and an acceleration value that have been detected.

Figure 15:
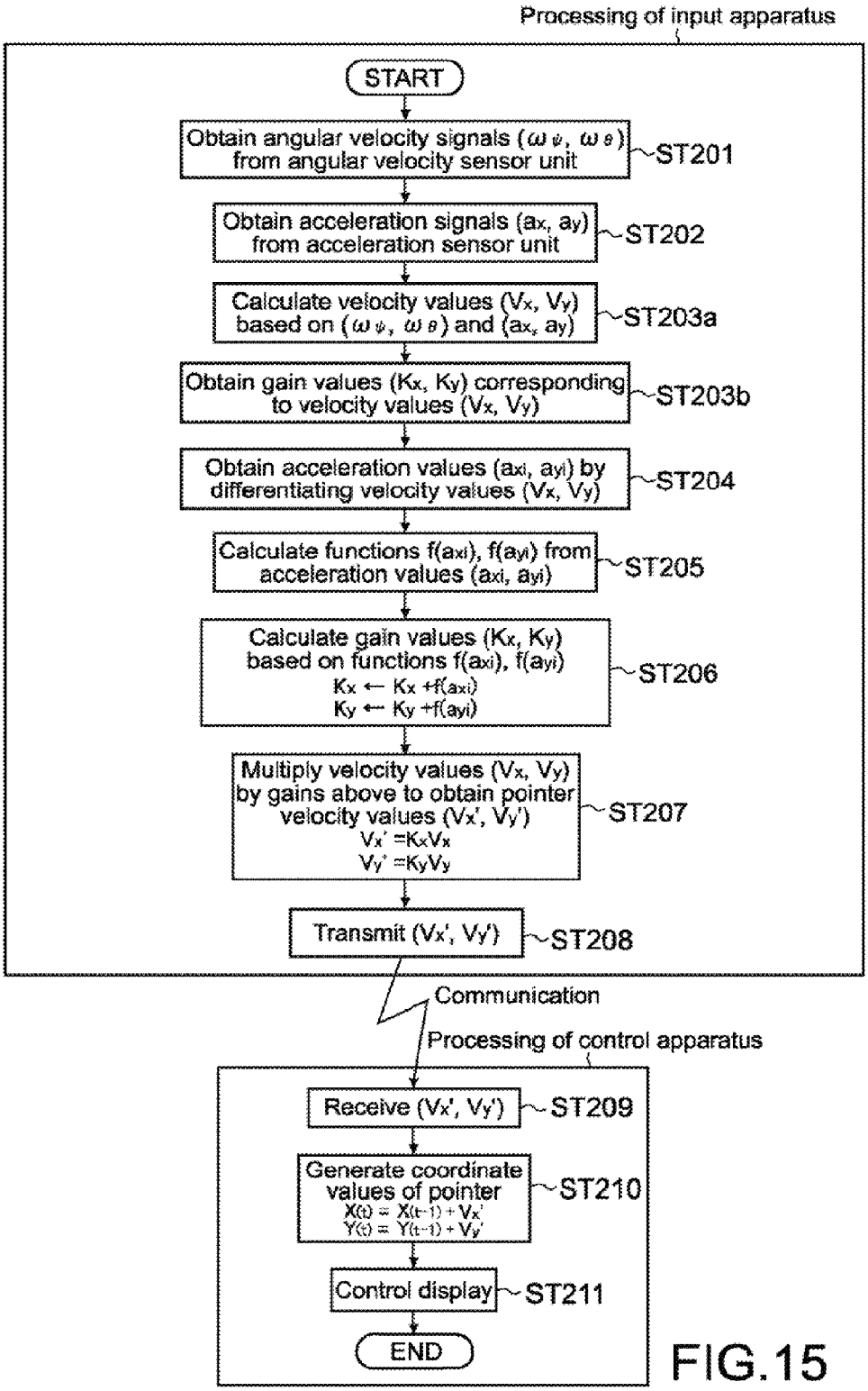
FIG. 15 A flowchart showing an operation of the control system in a case where the gain profile shown in FIG. 12(A) is used.

FIG. 15 is a flowchart showing an operation of the control system 100 in a case where the gain profile shown in FIG. 12(A) is used.

Processes of Steps 201 to 203a are the same as those of Steps 101 to 103 of FIG. 9. In Step 203b, the MPU 19 obtains gain values ($K_x$, $K_y$) that correspond to the velocity values ($V_x$, $V_y$) calculated in Step 203a.

In Step 204, the MPU 19 differentiates the velocity values ($V_x$, $V_y$) to obtain acceleration values ($a_{xi}$, $a_{yi}$) of the input apparatus 1 in the X- and Y-axis directions. By using the acceleration values ($a_{xi}$, $a_{yi}$) obtained by the differentiation operation, the control system 100 can recognize the movewent of the input apparatus 1 more accurately than in the case where the detection values ($a_x$, $a_y$) of the acceleration sensor unit 16 are used. This is because, as described above, the velocity values ($V_x$, $V_y$) obtained based on the acceleration values ($a_x$, $a_y$) and the angular velocity values ($\omega_\psi$, $\omega_\Theta$) are differentiated.

The MPU 19 calculates a function $f(a_i)$ (=$f(a_{xi})$, $f(a_{yi})$) from the obtained acceleration value $a_i$ (=($a_{xi}$, $a_{yi}$)) (Step 205). Upon calculating the function $f(a_i)$, the MPU 19 calculates a new gain value (operational value) based on the gain K and the function $f(a_i)$ (Step 206). Here, the new gain value K' is $K'=K+f(a_i)$ as described above, or may be $K'=K*f(a_i)$.

Here, when the gain value K (=K') obtained by the operation above exceeds the constant gain value K2, the MPU 19 only needs to set a maximum value of the gain value K to K2.

When the user starts moving the input apparatus 1 or stops moving the input apparatus 1, that is, when the input apparatus 1 moves at a high acceleration, no accurate pointing is required. According to the gain profile as shown in FIG. 12(A), the gain value K becomes more constant, that is, a relationship between the movement of the input apparatus 1 and the movement of the pointer 2 becomes more linear as the acceleration value $a_i$ of the input apparatus increases. For example, the threshold values v1 and v2 do not exist when the acceleration value $a_i$ has become a certain value or more, and the gain profile becomes linear like the gain value K2. Therefore, the pointer 2 starts moving smoothly when the user starts moving the input apparatus 1 at a high velocity, with the result that the user does not feel poor following capability of the pointer.

In the case of the gain profiles as shown in FIGS. 10(A) and 11(A), at the time of acceleration in particular, there may be users who feel poorness in the following capability. This is because, in terms of appearance, a response seems slow since the velocity of the pointer 2 is slow in the low-velocity range. In this regard, for enhancing the following capability with respect to such sharp acceleration, the gain only needs to be controlled in accordance with a level of the acceleration. In other words, it is effective to change a velocity profile so as to obtain more linearity as the acceleration of the casing increases.

Processes of Steps 207 to 211 are the same as those of Steps 104 to 108 of FIG. 9.

The following configuration is also possible as another embodiment of the gain profiles described above.

For example, in FIG. 10(A), 11(A), or 12(A), the MPU 19 may change a change rate of the gain value K in the range from the threshold value v1 to the threshold value v2 in accordance with the acceleration value $a_t$. When the gain is linear, the change rate is a tilt thereof. When the gain is a multi-degree curve, the gain is a differential value. At least one of the threshold values v1 and v2 may be changed. It is also possible to change, by changing at least one of the threshold values v1 and v2, the change rate of the gain so that the relationship between the movement of the input apparatus 1 and the movement of the pointer becomes more linear.

Alternatively, the MPU 19 may change the constant gain value K in the range in which the velocity value of the input apparatus 1 exceeds the threshold value v2 in accordance with the acceleration value $a_t$. For example, it is also possible for the gain value K to approach, from a first value as a constant value, a second value as a constant value larger than the first value as the acceleration value $a_t$ increases. The first value and the second value may be 1 or values other than 1.

Figure 10:
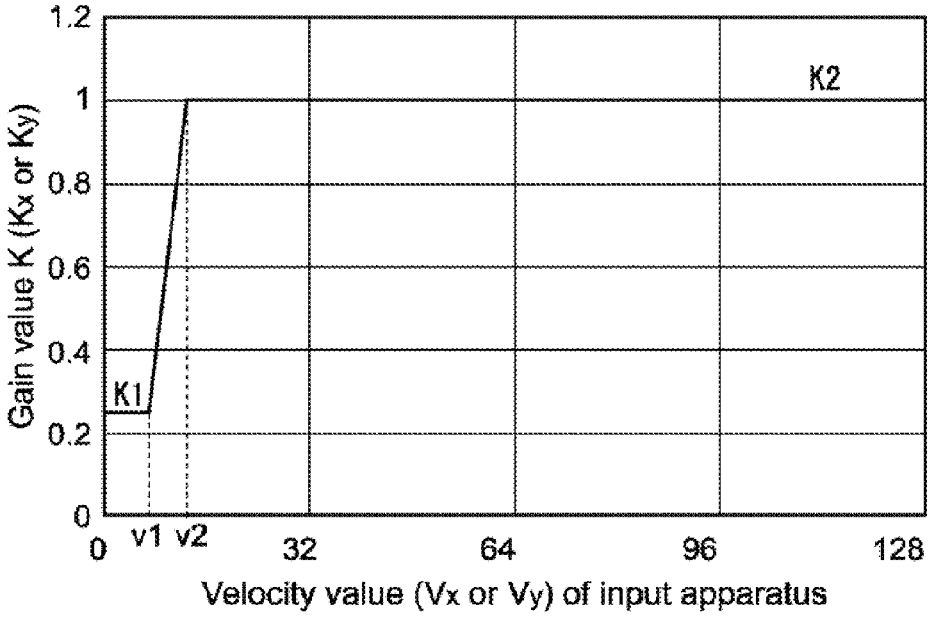
FIG. 10 Graphs showing profiles of gain value(s) $K_x$ and/or $K_y$ of Equation (1) or (2).
Figure 10:
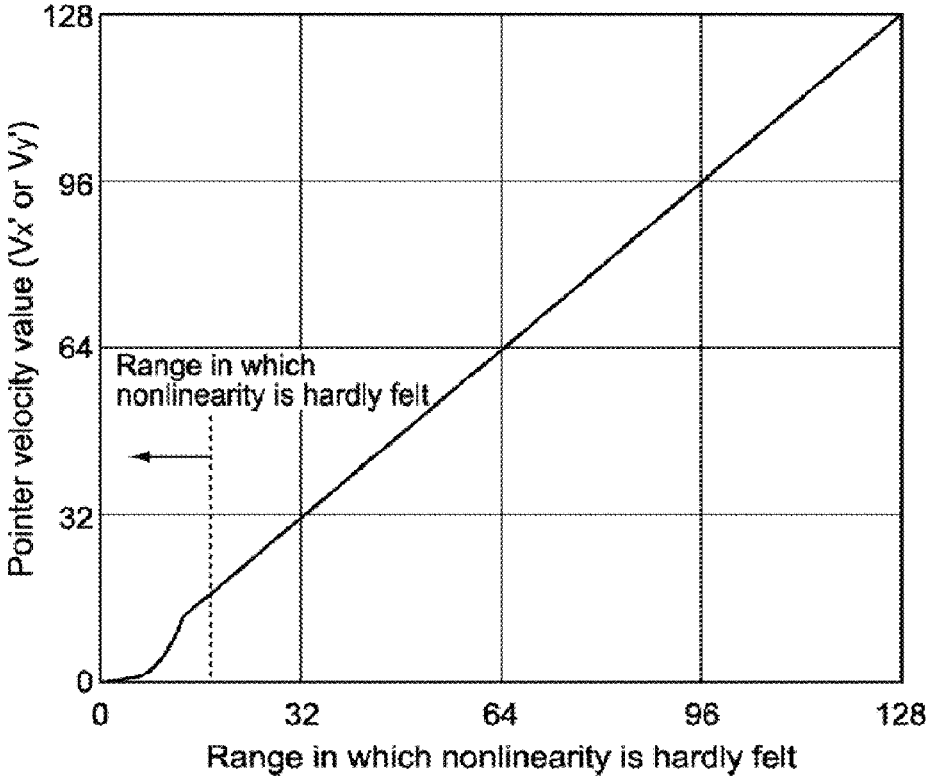
Figure 11:
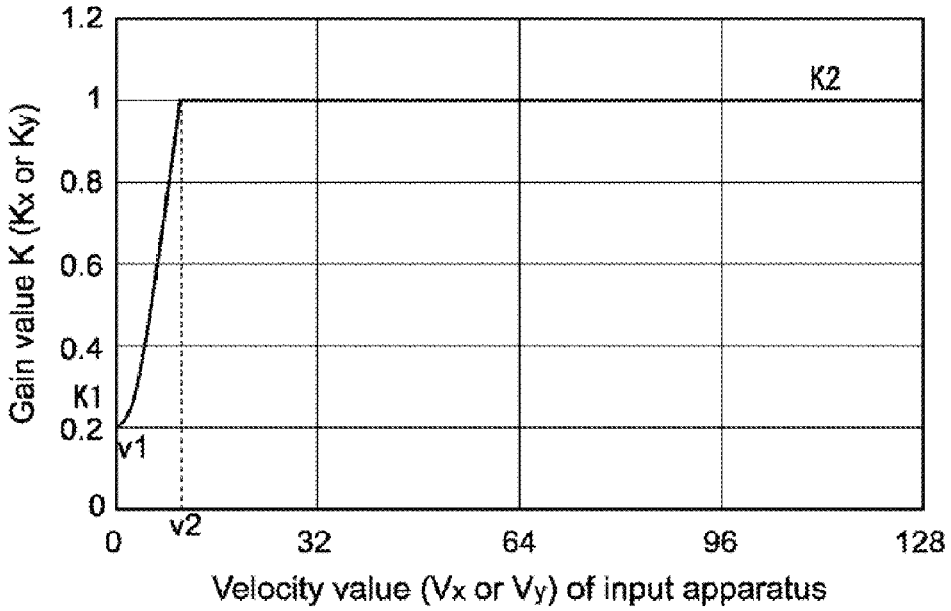
FIG. 11 (A) is a graph showing a gain profile according to another embodiment. (B) is a graph showing a velocity profile obtained by the gain profile shown in (A).
Figure 11:
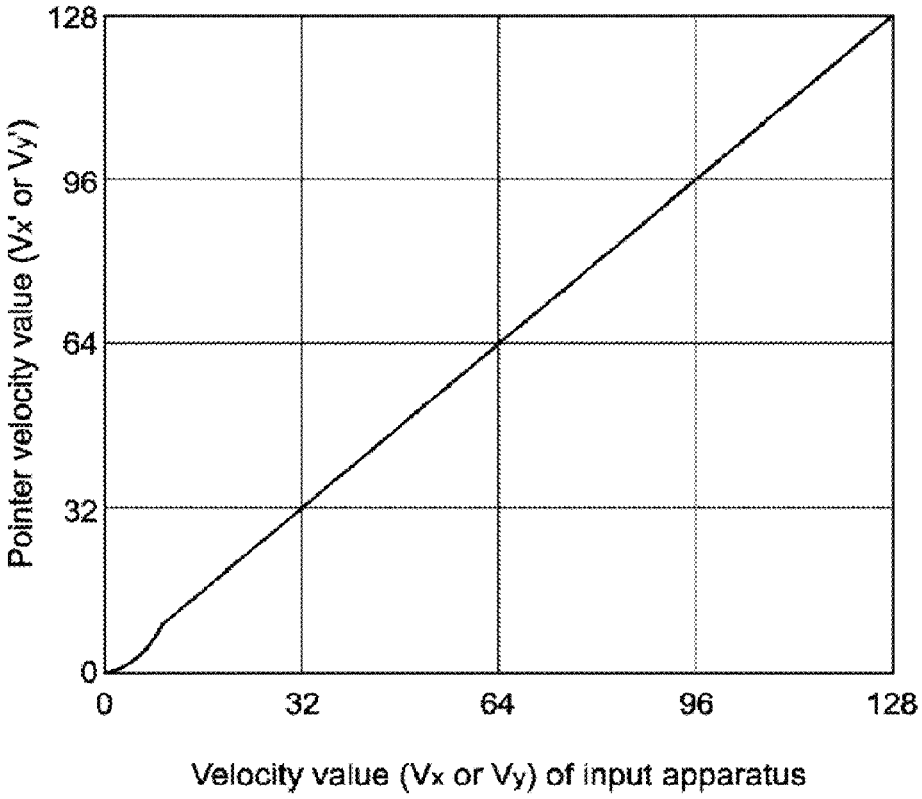
Figure 12:
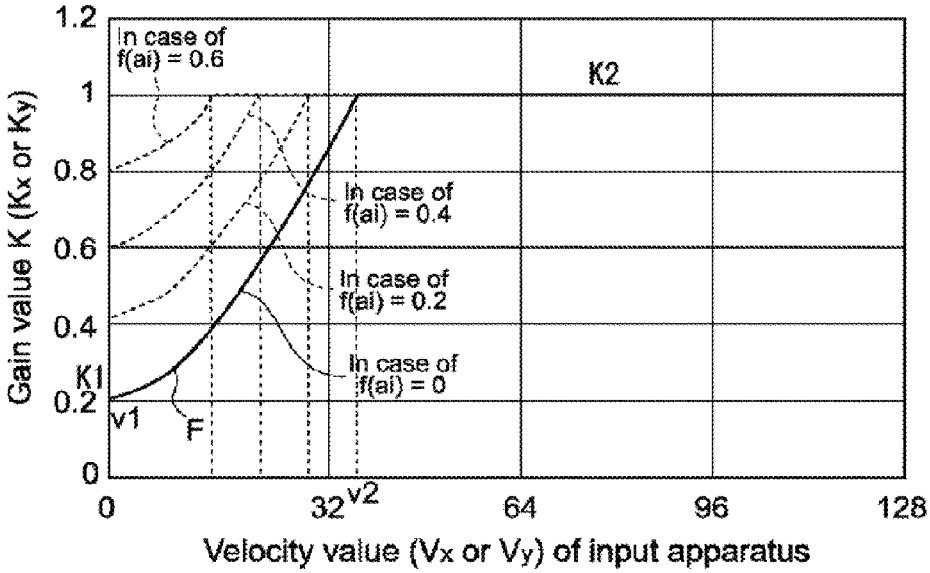
FIG. 12 (A) is a graph showing a gain profile according to still another embodiment. (B) is a graph showing a velocity profile obtained by the gain profile shown in (A).
Figure 12:
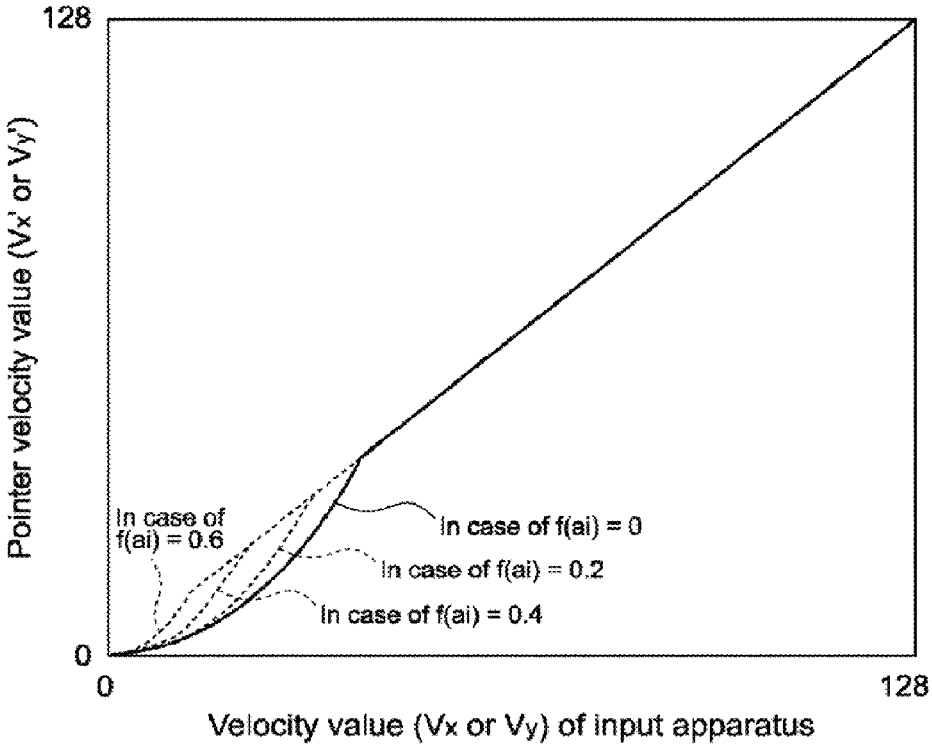

Here, regarding the gain profile shown in FIG. 10(A), 11(A), or 12(A), the MPU 19 only needs to control the gain with respect to the velocity values ($V_x$, $V_y$) in the X- and Y-axis directions based on the gain profile. In this case, the gain profile may differ between the X- and Y-axis directions. For example, one of the gain profiles shown in FIGS. 10(A) to 12(A) may be used for the X axis whereas a gain profile different from that for the X axis out of those shown in FIGS. 10(A) to 12(A) may be used for the Y axis.

Alternatively, the MPU 19 may variably control the gain in a range in which an operational value obtained based on the velocity values ($V_x$, $V_y$) calculated in Step 103 or 203 ranges from a third threshold value to a fourth threshold value larger than the third threshold value, and control the gain to be constant in a range in which the operational value exceeds the fourth threshold value. In this case, the third threshold value may either be v1 (first threshold value) or different from v1. Moreover, the fourth threshold value may either be v2 (second threshold value) or different from v2.

The operational value obtained based on the velocity values ($V_x$, $V_y$) is a value obtained by, for example, $V_x+V_y$ or $(V_x^2+V_y^2)^{1/2}$. The operational value may alternatively be a value obtained by an expression other than those operational expressions.

Alternatively, the MPU 19 may compare (absolute values of) the velocity values $V_x$ and $V_y$ calculated in Step 103 or 203 (comparison means) and use a larger one of the values as a representative value. Accordingly, a calculation amount can be reduced as compared to the case of using the operational value as described above or the case where the gain is controlled independently for the X axis and the Y axis.

In FIG. 9, the input apparatus 1 has carried out main operations to calculate the pointer velocity values ($V_x'$, $V_y'$). In an embodiment shown in FIG. 16, the control apparatus 40 carries out the main operations.

Figure 16:
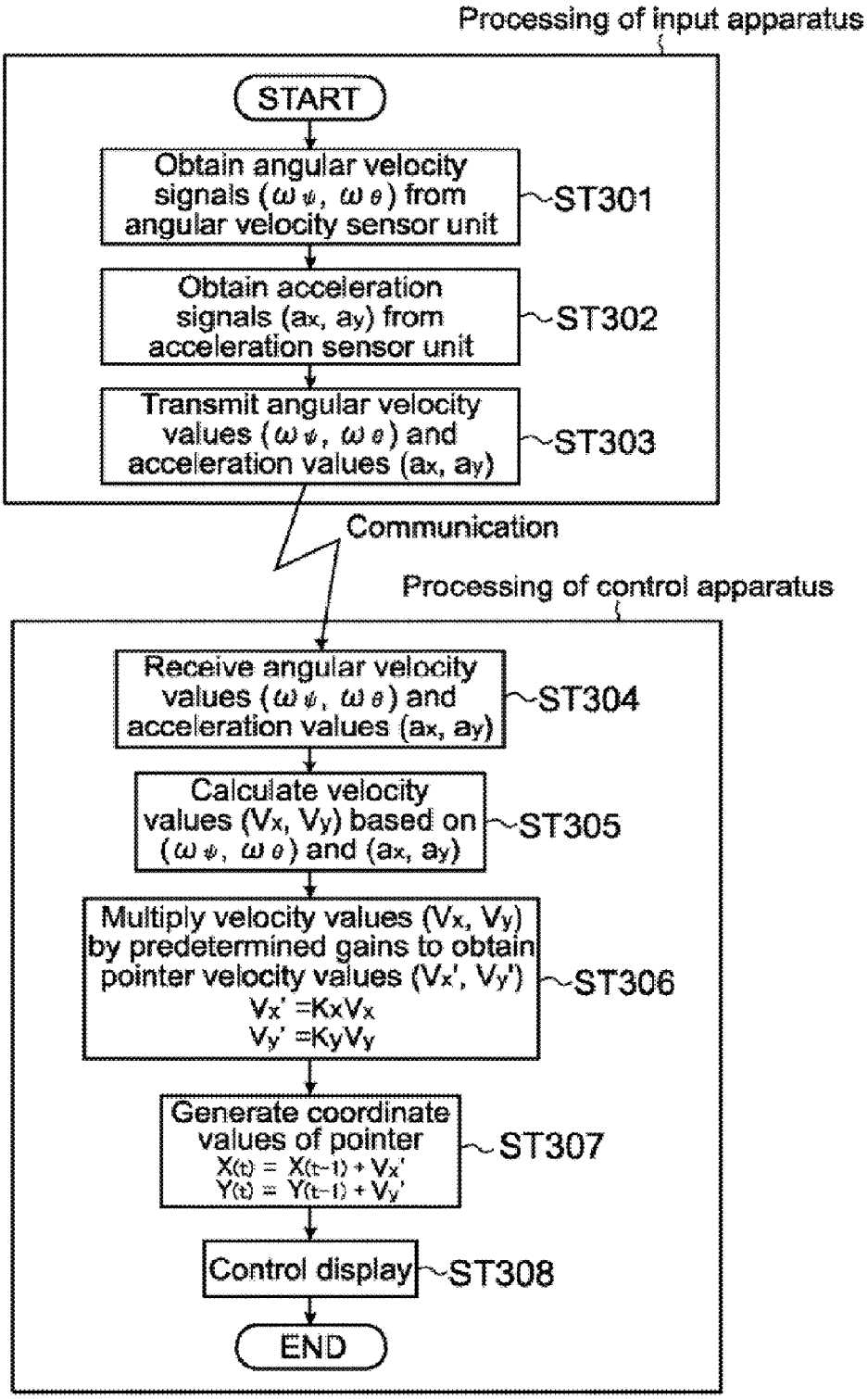
FIG. 16 A flowchart showing an operation of the control system in a case where a control apparatus carries out main operations.

As shown in FIG. 16, processes of Steps 301 and 302 are the same as those of Steps 101 and 102. The input apparatus 1 transmits to the control apparatus 40 information on detection values that are biaxial acceleration values and biaxial angular velocity values output from the sensor unit 17, for example (Step 303). The MPU 35 of the control apparatus 40 receives the information on the detection values (Step 304) and executes processes the same as those of Steps 103, 104, 107, and 108 (Steps 305 to 308).

Also in the flowchart shown in FIG. 15, it is possible for the control apparatus 40 to execute the main calculations in the same manner as the processing of FIG. 16. In this case, it is only necessary that, in FIG. 16, the input apparatus 1 execute Steps 201 and 202 and the control apparatus 40 execute Steps 203 to 207, 210, and 211.

Figure 17:
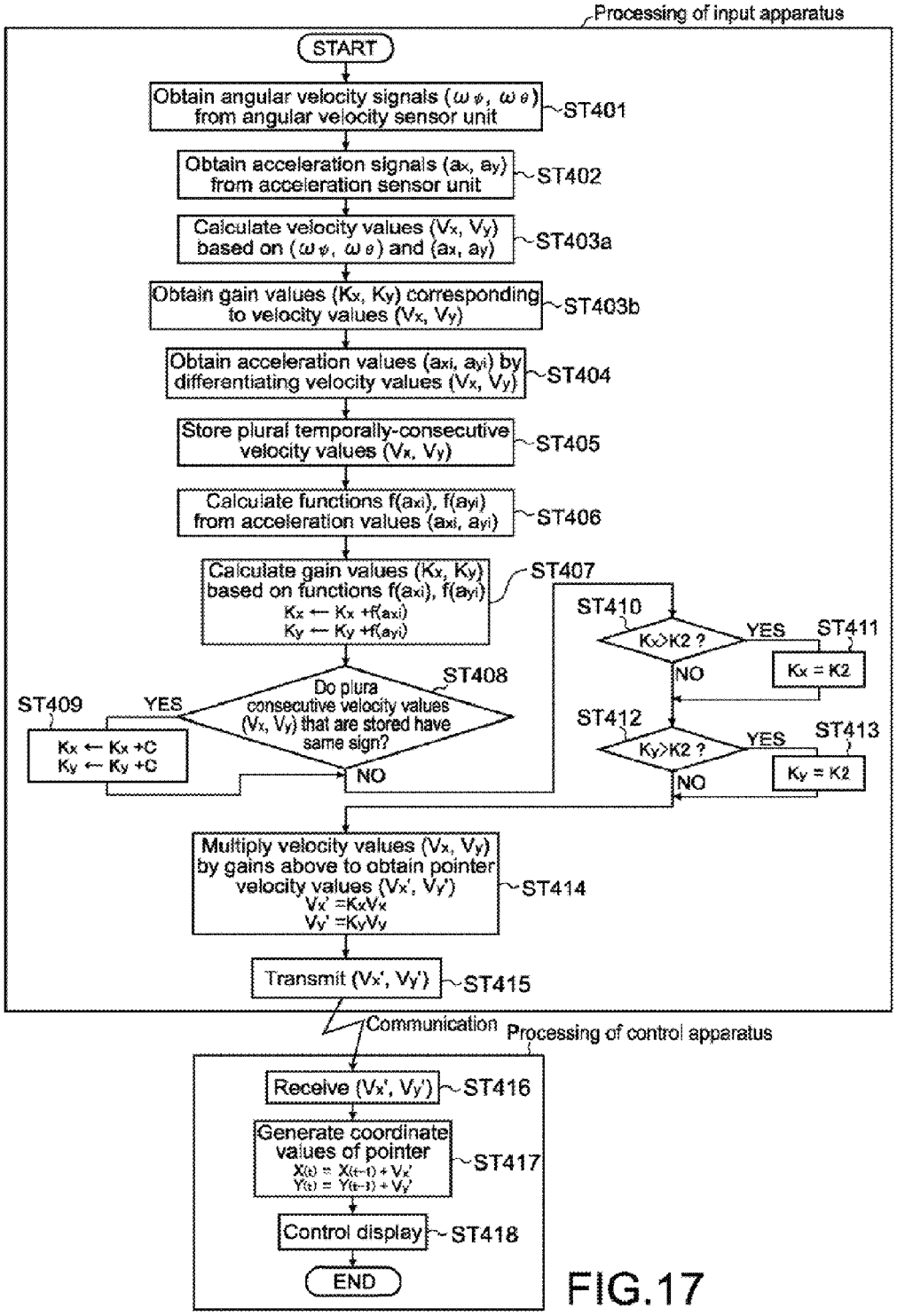
FIG. 17 A flowchart showing an operation of the control system according to another embodiment.

FIG. 17 is a flowchart showing an operation of the control system 100 according to another embodiment.

Processes of Steps 401, 402, 403a, 403b, and 404 are the same as those of Steps 201, 202, 203a, 204b, and 204.

In Step 405, the MPU 19 stores a plurality of temporally-consecutive velocity values ($V_x$, $V_y$) in the memory. In this case, a ring buffer or a FIFO (First In First Out) is used as the memory, but is not limited thereto. The number of samples of the velocity values ($V_x$, $V_y$) is typically about 5 to 10, but since it varies depending on a clock frequency of the MPU 19, it only needs to be set as appropriate.

Processes of Steps 406 and 407 are the same as those of Steps 205 and 206.

In Step 408, the MPU 19 judges whether signs of the plurality of consecutive velocity values ($V_x$, $V_y$) stored in the memory are the same (sign judgment means). If the signs are the same, a direction of the velocity of the input apparatus 1 has not changed during that period. In this case, it is considered that the user is in midst of moving the pointer 2 from a certain position on the screen 3 to a different position relatively distant therefrom, that is, a coarse motion operation in which accurate pointing is not performed is being made. Therefore, in this case, for the pointer velocity values to become more linear, the MPU 19 adds a constant C to the gain value K (=($K_x$, $K_y$)) calculated in Step 407 to thus calculate a new gain value K (Step 409). The constant C can be set as appropriate.

By adding a constant value in the processing as described above, the relationship between the movement of the input apparatus and the movement of the pointer becomes more linear, with the result that an operational feeling for the user can be improved.

However, for preventing the gain value K from exceeding K2 even when added with the constant C, the MPU 19 monitors whether the gain value K exceeds K2 (Steps 410 and 412). When the gain value K exceeds K2, the latest gain value K is assumed to be K2 as the constant value (Steps 411 and 413).

On the other hand, when at least one of the consecutive velocity values ($V_x$, $V_y$) has a sign different from those of other velocity values in Step 408, it is considered that a micromotion operation in which accurate pointing is performed is being made. In this case, the constant C is not added to the gain value K.

Processes of Steps 414 to 418 are the same as those of Steps 207 to 211.

It should be noted that in the judgment processing of Step 408, the MPU 19 typically advances to Step 409 when the signs of $V_x$ and $V_y$ are the same. However, it is also possible for the MPU 19 to apply, when the sign of one of $V_x$ and $V_y$ is the same, Step 409 to only the velocity value with the same sign out of the velocities on the X axis and the Y axis.

Moreover, in Step 409, it is also possible to calculate a new gain value K by multiplying the gain value K (=($K_x$, $K_y$)) calculated in Step 407 by a certain constant. The processing as described above also bears the same effect as that described above.

It is also possible for the MPU 19 not to execute Step 407 and execute the judgment processing of Step 408 after Step 406. In this case, the MPU 19 may execute Step 407 when judged YES in Step 408 and use the fixed gain profile shown in FIG. 10(A) or 11(A) when judged NO. Accordingly, in the case of a coarse motion operation, the relationship between the movement of the input apparatus 1 and the movement of the pointer 2 becomes more linear as the acceleration value increases, with the result that an operational feeling for the user can be improved.

Processes of Steps 403 to 414, 417, and 418 shown in FIG. 17 may also be executed by the control apparatus 40 in the same manner as the processing shown in FIG. 16, for example.

Figure 13:
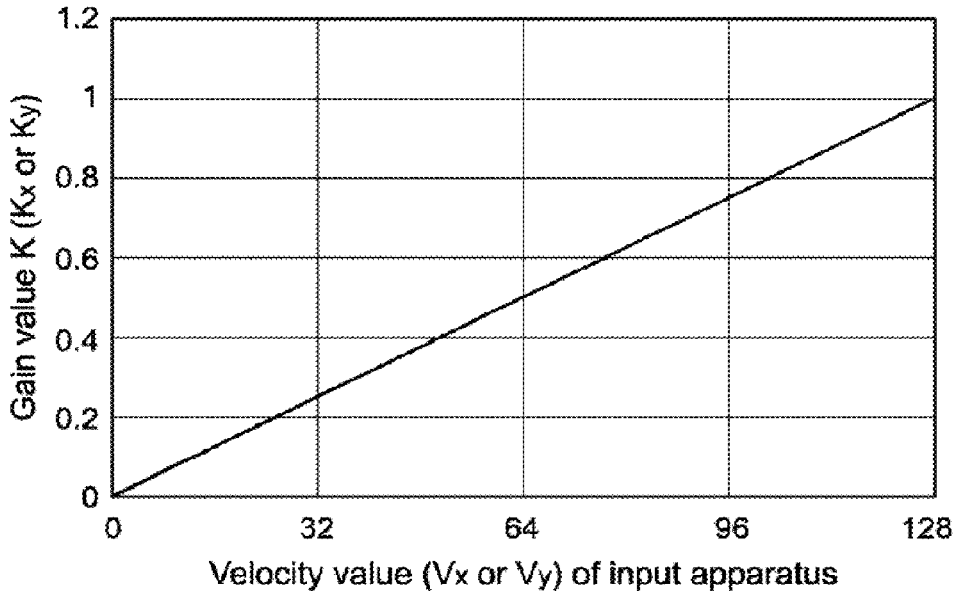
FIG. 13 (A) is a gain profile that increases linear-functionally from a 0 velocity value of the input apparatus to a high-velocity range. (B) is a pointer velocity profile obtained by the gain profile of (A).
Figure 13:
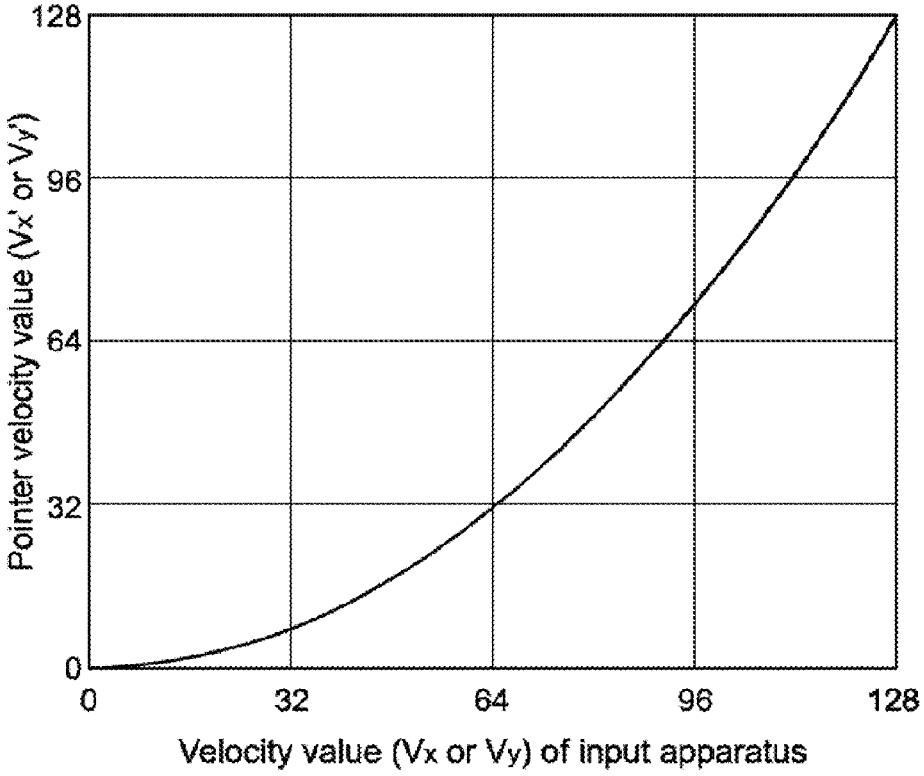
Figure 14:
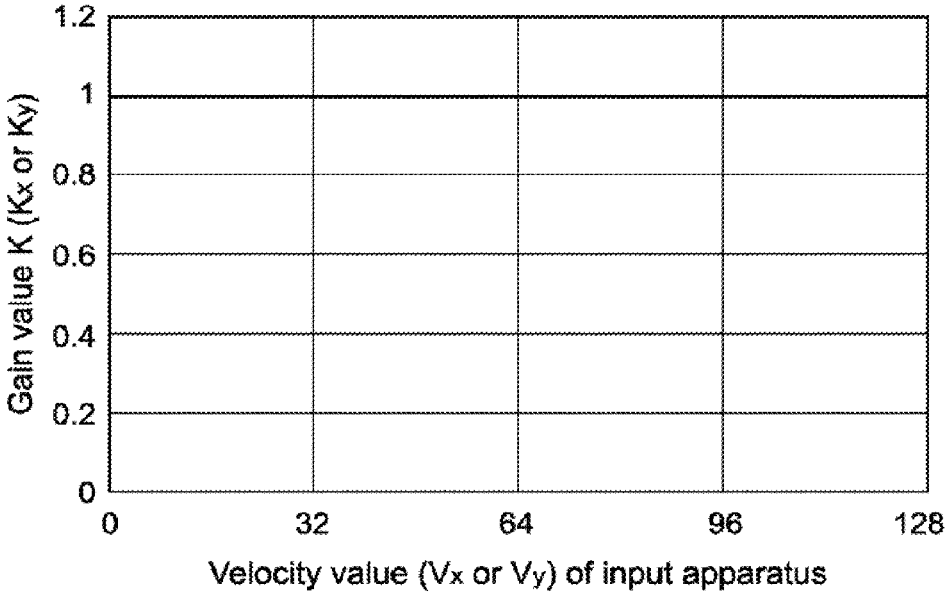
FIG. 14 (A) is a graph showing a gain profile that is constant from the 0 velocity value of the input apparatus to the high-velocity range.
Figure 14:
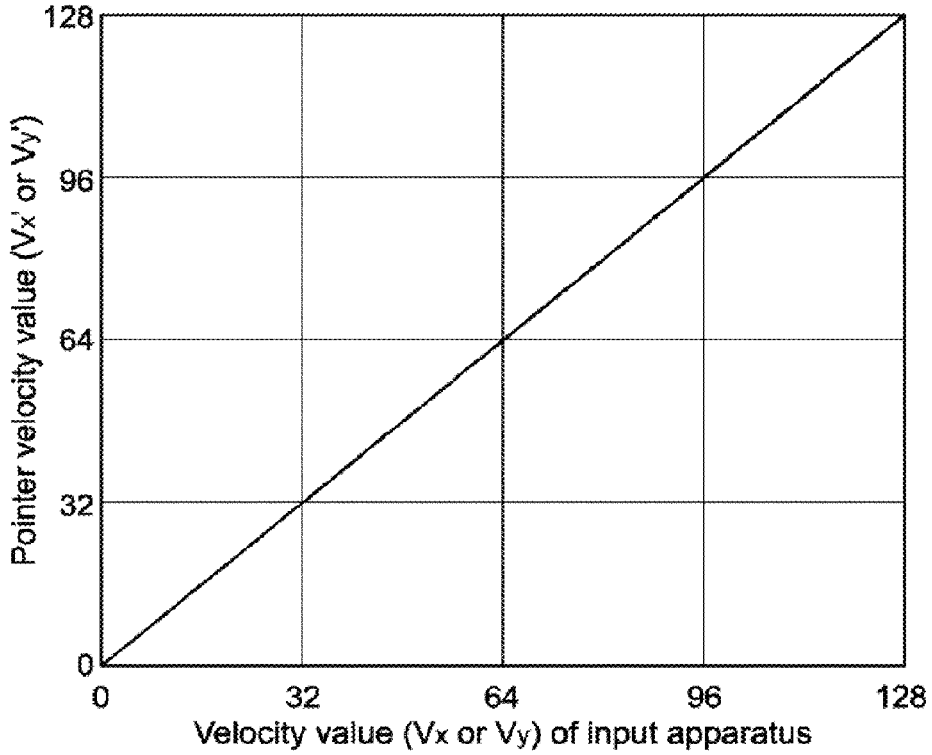

FIGS. 13 and 14 show reference examples of a gain profile.

A gain profile shown in FIG. 13(A) is a profile that increases linear-functionally from a 0 velocity value of the input apparatus to a high-velocity range. FIG. 13(B) shows a pointer velocity value obtained by the gain profile of FIG. 13(A). In this case, since the velocity value of the input apparatus and the pointer velocity value are nonlinear, the user feels awkward when using the 3-dimensional operation input apparatus.

A gain profile shown in FIG. 14(A) is constant from the 0 velocity value of the input apparatus to the high-velocity range. In this case, FIG. 14(B) shows a pointer velocity value obtained by the gain profile of FIG. 14(A). In this case, since the velocity profile becomes linear throughout all ranges, it becomes difficult to perform accurate pointing in the low-velocity range.

A function of adjusting at least one of the change rate of the gain (tilt etc.), the threshold value v1, the threshold value v2, and the constant gain value K2 (adjustment means) regarding the gain profile described with reference to FIG. 10(A), 11(A) or 12(A) described above may be provided to the input apparatus 1. For example, it is only necessary that information on the plurality of different gain profiles be stored in the memory or the like of the input apparatus 1 and the gain profile be switched by a mechanical switch, a static switch, or the like. Alternatively, the mechanical switch, the static switch, and the like may be provided to the control apparatus 40.

Alternatively, the input apparatus 1 or the control apparatus 40 only needs to include software including GUI as the adjustment means.

An embodiment is not limited to the above embodiments, and various other embodiments are also possible.

A configuration in which the input apparatus 1 includes the acceleration sensor unit 16 but not the angular velocity sensor unit 15 is also conceivable. In this case, the velocity values ($V_x$, $V_y$) are obtained by integrating the acceleration values ($a_x$, $a_y$) detected by the acceleration sensor unit 16 in Step 103 (provided that in this case, the angular velocities ($\omega_\psi$, $\omega_\theta$) about the Y axis and the X axis cannot be obtained). It is also possible to calculate accelerations using an image sensor instead of the acceleration sensor unit 16.

An angle sensor or an angular acceleration sensor may be used instead of the angular velocity sensor unit 15. As the angle sensor, there are a geomagnetic sensor, an image sensor, and the like. When using the geomagnetic sensor, angle values are detected. Therefore, in this case, the angular velocity values can be obtained by differentiating the angle values. The angular acceleration sensor is constituted of a combination of a plurality of acceleration sensors, and the angular velocity values can be obtained by integrating the angular acceleration values obtained by the angular acceleration sensor.

For example, the angular acceleration sensor for detecting angular accelerations about the Y axis and the X axis or a sensor for detecting angles may be used in calculating radius gyrations R(t) as described above. In this case, the angular velocity values ($\omega_\psi$, $\omega_\theta$) are obtained by integrating the angular acceleration values detected by the angular acceleration sensor. Alternatively, the angular velocity values ($\omega_\psi$, $\omega_\theta$) are obtained by differentiating the angle values detected by the angle sensor.

As a uniaxial angular acceleration sensor as the angular acceleration sensor above, two uniaxial acceleration sensors disposed on the radius gyrations R(t) are typically used. A difference between two acceleration values obtained by the two acceleration sensors is divided by a distance between the two acceleration sensors to thus calculate an angular velocity value of the input apparatus 1. Similar to the detection principle of the two uniaxial acceleration sensors described above, two biaxial acceleration sensors only need to be used as the biaxial angular acceleration sensor. In this case, in addition to the geomagnetic sensor and the image sensor, the biaxial acceleration sensors only need to be used as the angle sensor so as to realize a principle of obtaining, for example, a roll angle $\phi$ (angle about Z axis in FIG. 8). Therefore, the two biaxial acceleration sensors only need to be used for detecting biaxial angles about the Y axis and the X axis.

The control apparatus 40 may store software for determining a size of the icons 4 displayed on the screen 3 (determination means) in the ROM 37 or other storage devices. The software may be structured so that the user can customize the size of the icons 4. In this case, the MPU 35 of the control apparatus 40 may adjust at least one of the change rate or tilt of the gain in the range from the threshold value v1 to the threshold value v2, the gain value K1, the threshold value v1, the threshold value v2, and the gain value K2 in accordance with the determined size of the icons 4 (adjustment means).

For example, since accurate pointing may become less necessary as the size of the icons 4 increases, it is only necessary to use a gain profile with which the velocity value of the input apparatus 1 and the like and the pointer velocity value become more linear. In this case, the MPU 35 may store a plurality of gain profiles in advance and extract and use the plurality of gain profiles in accordance with the determined size of the icons 4. Alternatively, according to the determined size of the icons 4, the MPU 35 may create a gain profile by an operation and use it.

In addition to the gain profiles shown in FIGS. 10(A), 11(A), and 12(A), a configuration in which gain profiles differ (have different hysteresis) between a time of acceleration and a time of deceleration of the input apparatus 1 is also conceivable.

In the input apparatus of the above embodiments, input information has been transmitted to the control apparatus wirelessly. However, the input information may be transmitted by wire.

The embodiments may be applied to, for example, a handheld-type information processing apparatus (handheld apparatus) including a display section. In this case, by the user moving a main body of the handheld apparatus, a pointer displayed on the display section is moved. Examples of the handheld apparatus include a PDA (Personal Digital Assistance), a cellular phone, a portable music player, and a digital camera.

In the above embodiments, the pointer 2 that moves on the screen in accordance with the movement of the input apparatus 1 has been represented as an image of an arrow. However, the image of the pointer 2 is not limited to the arrow and may be a simple circle, square, or the like, or a character image or any other images.

The detection axes of each of the angular velocity sensor unit 15 and the acceleration sensor unit 16 of the sensor unit 17 do not necessarily need to be mutually orthogonal like the X' axis and the Y' axis described above. In this case, the accelerations respectively projected in the mutually-orthogonal axial directions can be obtained by a calculation that uses a trigonometric function. Similarly, the angular velocities about the mutually-orthogonal axes can be obtained by a calculation that uses the trigonometric function.

Descriptions have been given on the case where the X' and Y' detection axes of the angular velocity sensor unit 15 and the X' and Y' detection axes of the acceleration sensor unit 16 of the sensor unit 17 described in the above embodiments match. However, those detection axes do not necessarily need to match. For example, in a case where the angular velocity sensor unit 15 and the acceleration sensor unit 16 are mounted on a substrate, the angular velocity sensor unit 15 and the acceleration sensor unit 16 may be mounted while being deviated a predetermined rotation angle within a main surface of the substrate so that the detection axes of the angular velocity sensor unit 15 and the acceleration sensor unit 16 do not match. In this case, the accelerations and angular velocities with respect to the respective axes can be obtained by a calculation that uses the trigonometric function.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An input apparatus for controlling a movement of a pointer on a screen, the input apparatus comprising:

a casing;

a movement signal output means for detecting a three-dimensional movement of the casing and outputting a signal of a velocity-related value that is related to a velocity of the casing, wherein the movement signal output means includes:

a first acceleration sensor that detects a first acceleration in a direction along a first axis, a first output means for outputting a first angle-related value as a value related to a rotational angle of the casing about a second axis different from the direction along the first axis, and a first calculation means for calculating a first velocity value of the casing in the direction along the first axis as the velocity-related value based on the first acceleration value and the first angle-related value, a second acceleration sensor that detects a second acceleration in a direction along the second axis, a second output means for outputting a second angle-related value as a value related to a rotational angle of the casing about the first axis, and a second calculation means for calculating a second velocity value of the casing in the direction along the second axis as the velocity-related value based on the second acceleration value and the second angle-related value;

a comparison means for comparing the first velocity value and the second velocity value that have been calculated;

a gain means for obtaining a pointer velocity value as a velocity value for moving the pointer on the screen by multiplying the output velocity-related value by a gain;

a control means for variably controlling the gain in a first range in which the output velocity-related value ranges from a first threshold value to a second threshold value larger than the first threshold value, and controlling the gain to be constant in a second range in which the output velocity-related value exceeds the second threshold value, wherein the control means controls the gain with respect to a larger one of the first velocity value and the second velocity value as a result of the comparison; and a transmission means for transmitting information on the pointer velocity value obtained by the gain means.

2. The input apparatus according to claim 1, wherein the control means controls the gain so that the gain increases as the velocity-related value increases in the first range.

3. The input apparatus according to claim 2, wherein the movement signal output means outputs an acceleration value of the casing, and wherein the control means controls the gain so that the gain increases as the acceleration value increases in the first range.

4. The input apparatus according to claim 2, wherein the movement signal output means outputs an acceleration value of the casing, and wherein the control means changes a change rate of the gain in the first range in accordance with a change in the acceleration value.

5. The input apparatus according to claim 2, further comprising:

a storage means for storing information on a plurality of velocity-related values that are temporally consecutive in the first range; and a sign judgment means for judging whether signs of the plurality of stored velocity-related values are the same, wherein the control means includes a gain value storage means for storing a value of the gain in the first range and controls, when the signs of the plurality of velocity-related values are the same, the gain using a value obtained by adding a constant value to the stored gain value or multiplying the stored gain value by the constant value.

6. The input apparatus according to claim 2, wherein the control means controls a value of the gain to be constant when the value of the increased gain exceeds the constant gain.

7. The input apparatus according to claim 1, wherein the control means controls the gain to be constant in a third range in which the output velocity-related value ranges from 0 to the first threshold value.

8. The input apparatus according to claim 1, further comprising an adjustment means for adjusting at least one of a change rate of the gain in the first range, the first threshold value, the second threshold value, and a value of the gain in the second range.

9. The input apparatus according to claim 1, wherein the movement signal output means includes an acceleration sensor that detects an acceleration of the casing in a direction along a predetermined axis, and a velocity calculation means for calculating, as the velocity-related value, the velocity value of the casing in the direction along the predetermined axis of the casing by integrating the detected acceleration value.

10. The input apparatus according to claim 1, wherein the movement signal output means includes an output means for outputting an angular velocity value of the casing about the predetermined axis, and an obtainment means for obtaining the velocity value calculated based on the output angular velocity value as the velocity-related value.

11. The input apparatus according to claim 1, wherein the control means variably controls the gain in a range in which an operational value obtained based on the first velocity value and the second velocity value that have been calculated ranges from a third threshold value to a fourth threshold value larger than the third threshold value, and controls the gain to be constant in a range in which the operational value exceeds the fourth threshold value.

12. A control apparatus for controlling a movement of a pointer on a screen based on information on a detection value transmitted from an input apparatus including a casing, a detection means for detecting a three-dimensional movement of the casing, and a transmission means for transmitting the information on the detection value obtained by the detection means, the control apparatus comprising:

a reception means for receiving the information on the detection value;

a movement signal output means for outputting a signal corresponding to a velocity-related value that is related to a velocity of the casing based on the received information on the detection value;

a gain means for obtaining a pointer velocity value as a velocity value for moving the pointer on the screen by multiplying the output velocity-related value by a gain;

a control means for variably controlling the gain in a first range in which the output velocity-related value ranges from a first threshold value to a second threshold value larger than the first threshold value, and controlling the gain to be constant in a second range in which the output velocity-related value exceeds the second threshold value;

a coordinate information generation means for generating coordinate information of the pointer on the screen that corresponds to the pointer velocity value obtained by the gain means;

a determination means for determining a size of an icon on the screen; and an adjustment means for adjusting, in accordance with the size of an icon determined by the determination means, at least one of a change rate of the gain in the first range, the first threshold value, the second threshold value, and a value of the gain in the second range.

13. A control system for controlling a movement of a pointer on a screen, the control system comprising:

an input apparatus including:

a casing, a movement signal output means for detecting a three-dimensional movement of the casing and outputting a signal corresponding to a velocity-related value that is related to a velocity of the casing, the movement signal output means including:

a first acceleration sensor that detects a first acceleration in a direction along a first axis, a first output means for outputting a first angle-related value as a value related to a rotational angle of the casing about a second axis different from the direction along the first axis, and a first calculation means for calculating a first velocity value of the casing in the direction along the first axis as the velocity-related value based on the first acceleration value and the first angle-related value, a second acceleration sensor that detects a second acceleration in a direction along the second axis, a second output means for outputting a second angle-related value as a value related to a rotational angle of the casing about the first axis, and a second calculation means for calculating a second velocity value of the casing in the direction along the second axis as the velocity-related value based on the second acceleration value and the second angle-related value, a comparison means for comparing the first velocity value and the second velocity value that have been calculated, a gain means for obtaining a pointer velocity value as a velocity value for moving the pointer by multiplying the output velocity-related value by a gain, a control means for variably controlling the gain in a first range in which the output velocity-related value ranges from a first threshold value to a second threshold value larger than the first threshold value, and controlling the gain to be constant in a second range in which the output velocity-related value exceeds the second threshold value, wherein the control means controls the gain with respect to a larger one of the first velocity value and the second velocity value as a result of the comparison, and a transmission means for transmitting information on the pointer velocity value obtained by the gain means; and a control apparatus including:

a reception means for receiving the transmitted information on the pointer velocity value, and a coordinate information generation means for generating coordinate information of the pointer on the screen that corresponds to the received pointer velocity value.

14. The control system according to claim 13, wherein control apparatus includes:

a determination means for determining a size of an icon on the screen; and an adjustment means for adjusting, in accordance with the size of an icon determined by the determination means, at least one of a change rate of the gain in the first range, the first threshold value, the second threshold value, and a value of the gain in the second range.

15. A control system for controlling a movement of a pointer on a screen, the control system comprising:

an input apparatus including:

a casing, a detection means for detecting a three-dimensional movement of the casing, and a transmission means for transmitting information on a detection value obtained by the detection means; and a control apparatus including:

a reception means for receiving the transmitted information on the detection value, a movement signal output means for outputting a signal corresponding to a velocity-related value that is related to a velocity of the casing based on the received information on the detection value, a gain means for obtaining a pointer velocity value as a velocity value for moving the pointer by multiplying the output velocity-related value by a gain, a control means for variably controlling the gain in a first range in which the output velocity-related value ranges from a first threshold value to a second threshold value larger than the first threshold value, and controlling the gain to be constant in a second range in which the output velocity-related value exceeds the second threshold value, a coordinate information generation means for generating coordinate information of the pointer on the screen that corresponds to the pointer velocity value obtained by the gain means, a determination means for determining a size of an icon on the screen, and an adjustment means for adjusting, in accordance with the size of an icon determined by the determination means, at least one of a change rate of the gain in the first range, the first threshold value, the second threshold value, and a value of the gain in the second range.

16. A control method comprising:

detecting a three-dimensional movement of an input apparatus;

outputting a signal corresponding to a velocity-related value that is related to a velocity of the input apparatus, wherein the signal is calculated by:

detecting a first acceleration in a direction along a first axis, outputting a first angle-related value as a value related to a rotational angle of the input apparatus about a second axis different from the direction along the first axis, calculating a first velocity value of the input apparatus in the direction along the first axis as the velocity-related value based on the first acceleration value and the first angle-related value, detecting a second acceleration in a direction along the second axis, a second output means for outputting a second angle-related value as a value related to a rotational angle of the input apparatus about the first axis, and a second calculation means for calculating a second velocity value of the input apparatus in the direction along the second axis as the velocity-related value based on the second acceleration value and the second angle-related value;

comparing the first velocity value and the second velocity value that have been calculated;

variably controlling a gain for determining a pointer velocity value as a velocity value for moving a pointer on a screen, in a first range in which the output velocity-related value ranges from a first threshold value to a second threshold value larger than the first threshold value;

controlling the gain to be constant in a second range in which the output velocity-related value exceeds the second threshold value, wherein the gain is controlled with respect to a larger one of the first velocity value and the second velocity value as a result of the comparison;

outputting the pointer velocity value by multiplying the output velocity-related value by the controlled gain; and generating coordinate information of the pointer on the screen that corresponds to the pointer velocity value.

17. The control method according to claim 16, further comprising:

determining a size of an icon on the screen, and adjusting, in accordance with the size of the icon, at least one of a change rate of the gain in the first range, the first threshold value, the second threshold value, and a value of the gain in the second range.

18. A handheld apparatus for controlling a movement of a pointer on a screen, the handheld apparatus comprising:

a casing;

a display section to display the screen;

a movement signal output means for detecting a three-dimensional movement of the casing and outputting a signal of a velocity-related value that is related to a velocity of the casing, the movement signal output means including:

a first acceleration sensor that detects a first acceleration in a direction along a first axis, a first output means for outputting a first angle-related value as a value related to a rotational angle of the casing about a second axis different from the direction along the first axis, and a first calculation means for calculating a first velocity value of the casing in the direction along the first axis as the velocity-related value based on the first acceleration value and the first angle-related value, a second acceleration sensor that detects a second acceleration in a direction along the second axis, a second output means for outputting a second angle-related value as a value related to a rotational angle of the casing about the first axis, and a second calculation means for calculating a second velocity value of the casing in the direction along the second axis as the velocity-related value based on the second acceleration value and the second angle-related value;

a comparison means for comparing the first velocity value and the second velocity value that have been calculated;

a gain means for obtaining a pointer velocity value as a velocity value for moving the pointer on the screen by multiplying the output velocity-related value by a gain; and a control means for variably controlling the gain in a first range in which the output velocity-related value ranges from a first threshold value to a second threshold value larger than the first threshold value, and controlling the gain to be constant in a second range in which the output velocity-related value exceeds the second threshold value, wherein the control means controls the gain with respect to a larger one of the first velocity value and the second velocity value as a result of the comparison.

19. A control system for controlling a movement of a pointer on a screen, the control system comprising:

an input apparatus including:

a casing, a movement signal output means for detecting a three-dimensional movement of the casing and outputting a signal corresponding to a velocity-related value that is related to a velocity of the casing, a gain means for obtaining a pointer velocity value as a velocity value for moving the pointer by multiplying the output velocity-related value by a gain, a control means for variably controlling the gain in a first range in which the output velocity-related value ranges from a first threshold value to a second threshold value larger than the first threshold value, and controlling the gain to be constant in a second range in which the output velocity-related value exceeds the second threshold value, and a transmission means for transmitting information on the pointer velocity value obtained by the gain means; and a control apparatus including:

a reception means for receiving the transmitted information on the pointer velocity value, and a coordinate information generation means for generating coordinate information of the pointer on the screen that corresponds to the received pointer velocity value, a determination means for determining a size of an icon on the screen, and an adjustment means for adjusting, in accordance with the size of an icon determined by the determination means, at least one of a change rate of the gain in the first range, the first threshold value, the second threshold value, and a value of the gain in the second range.

20. A control method comprising:

detecting a three-dimensional movement of an input apparatus;

outputting a signal corresponding to a velocity-related value that is related to a velocity of the input apparatus;

variably controlling a gain for determining a pointer velocity value as a velocity value for moving a pointer on a screen, in a first range in which the output velocity-related value ranges from a first threshold value to a second threshold value larger than the first threshold value;

controlling the gain to be constant in a second range in which the output velocity-related value exceeds the second threshold value;

outputting the pointer velocity value by multiplying the output velocity-related value by the controlled gain;

generating coordinate information of the pointer on the screen that corresponds to the pointer velocity value;

determining a size of an icon on the screen; and adjusting, in accordance with the size of the icon, at least one of a change rate of the gain in the first range, the first threshold value, the second threshold value, and a value of the gain in the second range.

*21. An input apparatus for controlling a movement of a pointer on a screen, the input apparatus comprising:*

*a sensor unit;*

*a movement signal output means for detecting a movement of the sensor unit and outputting a signal of a velocity-related value that is related to a velocity of the sensor unit, wherein the movement signal output means includes:*

*a first acceleration sensor that detects a first acceleration in a direction along a first axis,*

*a first output means for outputting a first angle-related value as a value related to a rotational angle of the sensor unit about a second axis different from the direction along the first axis, and*

*a first calculation means for calculating a first velocity value of the sensor unit in the direction along the first axis as the velocity-related value based on the first acceleration value and the first angle-related value,*

*a second acceleration sensor that detects a second acceleration in a direction along the second axis,*

*a second output means for outputting a second angle-related value as a value related to a rotational angle of the sensor unit about the first axis, and*

*a second calculation means for calculating a second velocity value of the sensor unit in the direction along the second axis as the velocity-related value based on the second acceleration value and the second angle-related value;*

*a comparison means for comparing the first velocity value and the second velocity value that have been calculated;*

*a gain means for obtaining a pointer velocity value as a velocity value for moving the pointer on the screen by multiplying the output velocity-related value by a gain;*

*a control means for variably controlling the gain in a first range in which the output velocity-related value ranges from a first threshold value to a second threshold value larger than the first threshold value, and controlling the gain to be constant in a second range in which the output velocity-related value exceeds the second threshold value, wherein the control means controls the gain with respect to a larger one of the first velocity value and the second velocity value as a result of the comparison; and*

*a transmission means for transmitting information on the pointer velocity value obtained by the gain means.*

*22. The input apparatus according to claim 21,*

*wherein the control means controls the gain so that the gain increases as the velocity-related value increases in the first range.*

*23. The input apparatus according to claim 22,*

*wherein the movement signal output means outputs an acceleration value of the sensor unit, and*

*wherein the control means controls the gain so that the gain increases as the acceleration value increases in the first range.*

*24. The input apparatus according to claim 22,*

*wherein the movement signal output means outputs an acceleration value of the sensor unit, and*

*wherein the control means changes a change rate of the gain in the first range in accordance with a change in the acceleration value.*

*25. The input apparatus according to claim 22, further comprising:*

*a storage means for storing information on a plurality of velocity-related values that are temporally consecutive in the first range; and*

*a sign judgment means for judging whether signs of the plurality of stored velocity-related values are the same,*

*wherein the control means includes a gain value storage means for storing a value of the gain in the first range and controls, when the signs of the plurality of velocity-related values are the same, the gain using a value obtained by adding a constant value to the stored gain value or multiplying the stored gain value by the constant value.*

*26. The input apparatus according to claim 22,*

*wherein the control means controls a value of the gain to be constant when the value of the increased gain exceeds the constant gain.*

*27. The input apparatus according to claim 21,*

*wherein the control means controls the gain to be constant in a third range in which the output velocity-related value ranges from 0 to the first threshold value.*

*28. The input apparatus according to claim 21, further comprising*

*an adjustment means for adjusting at least one of a change rate of the gain in the first range, the first threshold value, the second threshold value, and a value of the gain in the second range.*

*29. The input apparatus according to claim 21,*

*wherein the movement signal output means includes*

*an acceleration sensor that detects an acceleration of the sensor unit in a direction along a predetermined axis, and*

*a velocity calculation means for calculating, as the velocity-related value, the velocity value of the sensor unit in the direction along the predetermined axis of the sensor unit by integrating the detected acceleration value.*

*30. The input apparatus according to claim 21,*

*wherein the movement signal output means includes*

*an output means for outputting an angular velocity value of the sensor unit about the predetermined axis, and*

*an obtainment means for obtaining the velocity value calculated based on the output angular velocity value as the velocity-related value.*

31. The input apparatus according to claim 21, wherein the control means variably controls the gain in a range in which an operational value obtained based on the first velocity value and the second velocity value that have been calculated ranges from a third threshold value to a fourth threshold value larger than the third threshold value, and controls the gain to be constant in a range in which the operational value exceeds the fourth threshold value.

32. The input apparatus according to claim 21, wherein the movement is a three-dimensional movement.

33. A control system for controlling a movement of a pointer on a screen, the control system comprising:

an input apparatus including:

a sensor unit, a movement signal output means for detecting a movement of the sensor unit and outputting a signal corresponding to a velocity-related value that is related to a velocity of the sensor unit, the movement signal output means including:

a first acceleration sensor that detects a first acceleration in a direction along a first axis, a first output means for outputting a first angle-related value as a value related to a rotational angle of the sensor unit about a second axis different from the direction along the first axis, and a first calculation means for calculating a first velocity value of the sensor unit in the direction along the first axis as the velocity-related value based on the first acceleration value and the first angle-related value, a second acceleration sensor that detects a second acceleration in a direction along the second axis, a second output means for outputting a second angle-related value as a value related to a rotational angle of the sensor unit about the first axis, and a second calculation means for calculating a second velocity value of the sensor unit in the direction along the second axis as the velocity-related value based on the second acceleration value and the second angle-related value, a comparison means for comparing the first velocity value and the second velocity value that have been calculated, a gain means for obtaining a pointer velocity value as a velocity value for moving the pointer by multiplying the output velocity-related value by a gain, a control means for variably controlling the gain in a first range in which the output velocity-related value ranges from a first threshold value to a second threshold value larger than the first threshold value, and controlling the gain to be constant in a second range in which the output velocity-related value exceeds the second threshold value, wherein the control means controls the gain with respect to a larger one of the first velocity value and the second velocity value as a result of the comparison, and a transmission means for transmitting information on the pointer velocity value obtained by the gain means; and a control apparatus including:

a reception means for receiving the transmitted information on the pointer velocity value, and a coordinate information generation means for generating coordinate information of the pointer on the screen that corresponds to the received pointer velocity value.

34. The control system according to claim 33, wherein control apparatus includes:

a determination means for determining a size of an icon on the screen; and an adjustment means for adjusting, in accordance with the size of an icon determined by the determination means, at least one of a change rate of the gain in the first range, the first threshold value, the second threshold value, and a value of the gain in the second range.

35. The control system according to claim 33, wherein the movement is a three-dimensional movement.

36. A control method comprising:

detecting a movement of a sensor unit of an input apparatus;

outputting a signal corresponding to a velocity-related value that is related to a velocity of the sensor unit, wherein the signal is calculated by:

detecting a first acceleration in a direction along a first axis, outputting a first angle-related value as a value related to a rotational angle of the sensor unit about a second axis different from the direction along the first axis, calculating a first velocity value of the sensor unit in the direction along the first axis as the velocity-related value based on the first acceleration value and the first angle-related value, detecting a second acceleration in a direction along the second axis, a second output means for outputting a second angle-related value as a value related to a rotational angle of the sensor unit about the first axis, and a second calculation means for calculating a second velocity value of the sensor unit in the direction along the second axis as the velocity-related value based on the second acceleration value and the second angle-related value;

comparing the first velocity value and the second velocity value that have been calculated;

variably controlling a gain for determining a pointer velocity value as a velocity value for moving a pointer on a screen, in a first range in which the output velocity-related value ranges from a first threshold value to a second threshold value larger than the first threshold value;

controlling the gain to be constant in a second range in which the output velocity-related value exceeds the second threshold value, wherein the gain is controlled with respect to a larger one of the first velocity value and the second velocity value as a result of the comparison;

outputting the pointer velocity value by multiplying the output velocity-related value by the controlled gain; and generating coordinate information of the pointer on the screen that corresponds to the pointer velocity value.

37. The control method according to claim 36, further comprising:

determining a size of an icon on the screen, and adjusting, in accordance with the size of the icon, at least one of a change rate of the gain in the first range, the first threshold value, the second threshold value, and a value of the gain in the second range.

38. The control method according to claim 36, wherein the movement is a three-dimensional movement.

* * * * *